US012782844B2

(12) United States Patent
Yamaguchi

(10) Patent No.: US 12,782,844 B2
(45) Date of Patent: Nov. 3, 2026

(54) IMAGE FORMING APPARATUS INCLUDING RESIN ASSEMBLY WITH AIR FLOW PASSAGES FOR TONER CONVEYANCE

(71) Applicant: CANON KABUSHIKI KAISHA, Tokyo (JP)

(72) Inventor: Noritomo Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 18/948,370

(22) Filed: Nov. 14, 2024

(65) Prior Publication Data

US 2025/0172889 A1 May 29, 2025

(30) Foreign Application Priority Data

Nov. 27, 2023 (JP) ................................ 2023-200227

(51) Int. Cl.
*G03G 15/08* (2006.01)

(52) U.S. Cl.
CPC ..... *G03G 15/0879* (2013.01); *G03G 15/0875* (2013.01); *G03G 15/0898* (2013.01)

(58) Field of Classification Search
CPC ........... G03G 15/0879; G03G 15/0875; G03G 21/206; G03G 21/1647
See application file for complete search history.

(56) References Cited

U.S. PATENT DOCUMENTS

| | | | | |
|---|---|---|---|---|
| 6,201,941 | B1 * | 3/2001 | Kasahara | G03G 15/0822 399/256 |
| 9,599,951 | B2 | 3/2017 | Yamaguchi et al. | G03G 21/16 |
| 11,281,147 | B2 | 3/2022 | Tanaka et al. | G03G 15/00 |
| 2019/0011854 | A1 * | 1/2019 | Suenaga | G03G 15/0856 |
| 2019/0184702 | A1 | 6/2019 | Takekoshi et al. | B41J 2/14 |
| 2022/0206411 | A1 | 6/2022 | Matsuzaki et al. | G03G 15/08 |

FOREIGN PATENT DOCUMENTS

| | | |
|---|---|---|
| JP | 2000-081778 | 3/2000 |
| JP | 2000-147884 | 5/2000 |
| JP | 2004-037911 | 2/2004 |
| JP | 2007-328048 | 12/2007 |
| JP | 2010-139564 | 6/2010 |
| JP | 2019-107775 | 7/2019 |
| JP | 2021-047224 | 3/2021 |

OTHER PUBLICATIONS

Extended European Search Report dated Mar. 31, 2025 in counterpart EP Application No. 24214114.1.

* cited by examiner

*Primary Examiner* — Arlene Heredia Ocasio
(74) *Attorney, Agent, or Firm* — Venable LLP

(57) ABSTRACT

An image forming apparatus includes an air supplying portion and a flow passage forming portion in which a first flow passage, a second flow passage, and a third flow passage are formed. The flow passage forming portion includes a first member having a first surface and a second surface, a second member having a third surface, and a third member having a fourth surface. The first flow passage is formed in a gap between the first surface and the third surface. The third flow passage is formed in a gap between the second surface and the fourth surface. At least part of the second flow passage is a tunnel passing through an interior of the first member.

19 Claims, 12 Drawing Sheets

IMAGE FORMING APPARATUS INCLUDING RESIN ASSEMBLY WITH AIR FLOW PASSAGES FOR TONER CONVEYANCE

BACKGROUND OF THE INVENTION

Field of the Invention

The present invention relates to an image forming apparatus that forms an image on a recording material.

Description of the Related Art

Japanese Patent Laid-Open No. 2000-81778 discloses replenishing a developing unit with toner from a toner container by an air generated by an air pump.

SUMMARY OF THE INVENTION

The present invention provides an image forming apparatus capable of improving the design flexibility of a flow passage and suppressing deterioration of airtightness of a flow passage.

According to an aspect of the invention, an image forming apparatus includes an air supplying portion configured to supply air for conveying toner, and a flow passage forming portion in which a first flow passage, a second flow passage, and a third flow passage are formed such that the air supplied by the air supplying portion flows through the first flow passage, the second flow passage, and the third flow passage in this order, wherein the flow passage forming portion includes a first member having a first surface and a second surface, a second member having a third surface, and a third member having a fourth surface, the first surface and the second surface intersecting with each other with a ridge portion therebetween, wherein the first flow passage is formed in a gap between the first surface and the third surface, wherein the third flow passage is formed in a gap between the second surface and the fourth surface, wherein at least part of the second flow passage is a tunnel passing through an interior of the first member, and wherein a first connecting portion where the first flow passage and the second flow passage are connected to each other and a second connecting portion where the second flow passage and the third flow passage are connected to each other are provided at positions away from the ridge portion.

Further features of the present invention will become apparent from the following description of exemplary embodiments with reference to the attached drawings.

DESCRIPTION OF THE EMBODIMENTS

Embodiments of the present disclosure will be described in detail below with reference to drawings.

In the present disclosure, “image forming apparatus” generally refers to an apparatus having a function of forming an image on a sheet serving as a recording material (recording medium). The image forming apparatus may be a monofunctional printer, a copier, or a multifunctional apparatus. The image forming apparatus may be an apparatus that mainly forms a color image, or an apparatus that mainly forms a monochromatic image. In addition, the image forming apparatus may be a system (image forming system) in which an accessory device that is used together with an image forming apparatus body that forms an image on a recording material is connected to the image forming apparatus body. Examples of the accessory device include a sheet processing apparatus (finisher) that performs processing such as a binding process on sheets on which images have been formed, a conveyance apparatus that conveys a sheet from the image forming apparatus body to another apparatus, and a feeding apparatus (optional feeder) that feeds a sheet toward the image forming apparatus body.

First Embodiment

Figure 1:
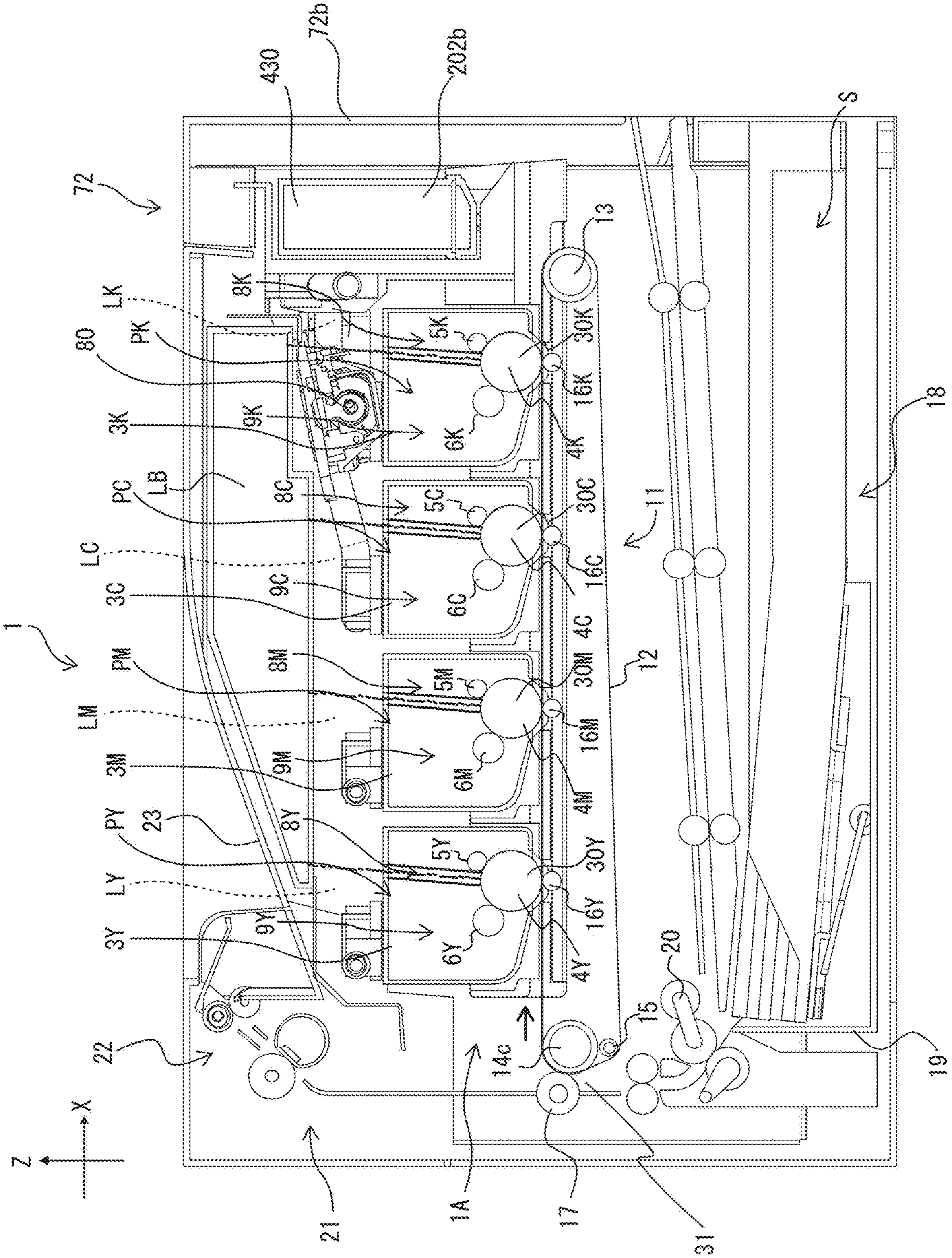
FIG. 1 is a schematic view of an image forming apparatus according to a first embodiment.

An image forming apparatus 1 according to the first embodiment of the present disclosure will be described with reference to FIG. 1. FIG. 1 is a section view taken along a plane orthogonal to the direction of the rotational axis of a photosensitive drum 4Y of the image forming apparatus 1.

The image forming apparatus 1 is a full-color image forming apparatus (full-color laser printer) including process units of four colors. The image forming apparatus 1 can form a full-color image on a recording material S by an electrophotographic process. A wide variety of sheet materials of different sizes and materials can be used as the recording material S (recording medium). Examples of the sheet materials include paper sheets such as plain paper sheets and cardboards, surface-treated sheet materials such as coated paper sheets, sheet materials of irregular shapes such as envelopes and index paper sheets, plastic films, and cloths.

In the description and drawings below, the vertical direction (gravity direction) in the case where the image forming apparatus 1 is installed on a horizontal surface will be referred to as a Z-axis direction. The direction of the rotational axis of a photosensitive drum (image bearing member) included in the image forming apparatus 1 will be referred to as a Y-axis direction. A direction intersecting with both the Z-axis direction and the Y-axis direction will be referred to as an X-axis direction. The X-axis direction, the Y-axis direction, and the Z-axis direction are preferably orthogonal to each other.

The positive direction and the negative direction in directions along each coordinate axis will be indicated by using a sign of + (plus) and − (minus) if necessary. For example, the positive direction along the X axis (direction indicated by an X arrow in the drawings) will be referred to as a +X direction, and the negative direction along the X axis (direction opposite to the direction of the arrow) will be referred to as a −X direction.

In addition, elements attachable to and detachable from an apparatus body 72 of the image forming apparatus 1, such as a cartridge, will be described on the basis of the posture thereof in the state of being attached to the apparatus body 72.

As illustrated in FIG. 1, the image forming apparatus 1 includes process units PY, PM, PC, and PK, an intermediate transfer belt unit 11, and the apparatus body 72. The process units PY, PM, PC, and PK are arranged in parallel in the X-axis direction, and each accommodate toner of a different color. In the description below, arbitrary one of the process units PY, PM, PC, and PK will be described as a process unit P. The longitudinal direction of each process unit P is the Y-axis direction. The process units PY, PM, PC, and PK will be respectively referred to as a first process unit, a second process unit, a third process unit, and a fourth process unit.

Each process unit P includes a processing element for executing an electrophotographic process. A rotational driving force is transmitted to each process unit P from a drive output portion (not illustrated) of the apparatus body 72, and a bias voltage (charging bias, developing bias, etc.) is supplied to each process unit P from a bias applying portion (not illustrated) of the apparatus body 72.

As illustrated in FIG. 1, the process units PY, PM, PC, and PK respectively include drum units 8Y, 8M, 8C, and 8K. The drum units 8Y, 8M, 8C, and 8K respectively include photosensitive drums 4Y, 4M, 4C, and 4K, and charging rollers 5Y, 5M, 5C, and 5K serving as processing portions that act on the photosensitive drums 4Y, 4M, 4C, and 4K. In the description below, arbitrary one of the drum units 8Y, 8M, 8C, and 8K will be described as a drum unit 8, arbitrary one of the photosensitive drums 4Y, 4M, 4C, and 4K will be described as a photosensitive drum 4, and arbitrary one of the charging rollers 5Y, 5M, 5C, and 5K will be described as a charging roller 5. Each photosensitive drum 4 is disposed such that the direction of the rotational axis thereof is the Y-axis direction, and is rotatable about the rotational axis. The photosensitive drums 4Y, 4M, 4C, and 4K respectively serve as a first photosensitive drum, a second photosensitive drum, a third photosensitive drum, and a fourth photosensitive drum.

The process units PY, PM, PC, and PK respectively include developing units 9Y, 9M, 9C, and 9K respectively including developing rollers 6Y, 6M, 6C, and 6K that each develop an electrostatic latent image on the photosensitive drum 4 corresponding thereto. The developing units 9Y, 9M, 9C, and 9K are arranged in parallel in the X-axis direction. The developing rollers 6Y, 6M, 6C, and 6K respectively serve as a first developing roller, a second developing roller, a third developing roller, and a fourth developing roller. The developing units 9Y, 9M, 9C, and 9K respectively serve as a first developing unit, a second developing unit, a third developing unit, and a fourth developing unit. In the description below, arbitrary one of the developing units 9Y, 9M, 9C, and 9K will be described as a developing unit 9, and arbitrary one of the developing rollers 6Y, 6M, 6C, and 6K will be described as a developing roller 6.

The developing units 9Y, 9M, 9C, and 9K respectively include developing containers 3Y, 3M, 3C, and 3K. In the description below, arbitrary one of the developing containers 3Y, 3M, 3C, and 3K will be referred to as a developing container 3. The developing unit 9Y includes a developing container 3Y (first developing container) that accommodates yellow (Y) toner (first toner), and is configured such that the yellow toner is supplied to the surface of the photosensitive drum 4Y by the developing roller 6Y bearing the yellow toner. The developing unit 9M includes a developing container 3M (second developing container) that accommodates magenta (M) toner (second toner), and is configured such that the magenta toner is supplied to the surface of the photosensitive drum 4M by the developing roller 6M bearing the magenta toner. The developing unit 9C includes a developing container 3C (third developing container) that accommodates cyan (C) toner (third toner), and is configured such that the cyan toner is supplied to the surface of the photosensitive drum 4C by the developing roller 6C bearing the cyan toner. The developing unit 9K includes a developing container 3K (fourth developing container) that accommodates black (K) toner (fourth toner), and is configured such that the black toner is supplied to the surface of the photosensitive drum 4K by the developing roller 6K bearing the black toner.

A laser scanner unit LB (exposing unit) is provided above the process units PY, PM, PC, and PK (photosensitive drums 4Y, 4M, 4C, and 4K) in the Z-axis direction intersecting with both the X-axis direction and the Y-axis direction. The laser scanner unit LB outputs laser light corresponding to image information. Hereinafter, the optical paths of laser light toward the photosensitive drums 4Y, 4M, 4C, and 4K will be respectively denoted by LY, LM, LC, and LK. The laser light emitted from the laser scanner unit LB scans and exposes the surface of the photosensitive drums 4Y, 4M, 4C, and 4K. To be noted, an LED exposing unit may be used instead of the laser scanner unit LB.

The intermediate transfer belt unit 11 including a transfer belt 12 serving as a transfer member (intermediate transfer member) is provided below the process units P in the Z-axis direction. The intermediate transfer belt unit 11 includes a driving roller 14, a tension roller 13, and an assist roller 15. The transfer belt 12 having flexibility and an endless shape is stretched over these rollers.

The lower surface of each photosensitive drum 4 is in contact with the upper surface of the transfer belt 12. The contact portions between the photosensitive drums 4Y, 4M, 4C, and 4K and the transfer belt 12 will be respectively referred to as primary transfer portions 30Y, 30M, 30C, and 30K (hereinafter referred to as primary transfer portions 30). On the inner peripheral side of the transfer belt 12, primary transfer rollers 16Y, 16M, 16C, and 16K (hereinafter referred to as transfer rollers 16) are provided to oppose the photosensitive drums 4Y, 4M, 4C, and 4K.

A secondary transfer roller 17 is in pressure contact with the driving roller 14 with the transfer belt 12 therebetween. The contact portion between the transfer belt 12 and the secondary transfer roller 17 serves as a secondary transfer portion 31. The secondary transfer portion 31 is a transfer portion where an image (toner image) is transferred onto the recording material S by the image forming portion 1A.

The process units PY, PM, PC, and PK and the intermediate transfer belt unit 11 constitute an image forming portion 1A of a tandem/intermediate transfer type serving as an image forming portion of the present embodiment. The image forming portion 1A forms an image (developer image) by using toner (developer) accommodated in the developing containers 3Y, 3M, 3C, and 3K serving as accommodating portions.

A feeding unit 18 is provided in a lower portion (portion below the intermediate transfer belt unit 11 in the Z-axis direction) of the apparatus body 72. The feeding unit 18 includes a feeding tray 19 (sheet accommodating portion) that accommodates a stack of recording materials S, and a feeding roller 20 serving as a feeding member that picks up a recording material S from the feeding tray 19 and conveys the recording material S.

In an upper portion of the apparatus body 72, a fixing unit 21 that fixes the toner image to the recording material S and a discharge roller 22 serving as a discharging member that discharges the recording material S to which the toner image has been fixed onto a discharge tray 23. The discharge roller 22 discharges the recording material S in a direction along the X-axis direction. The fixing unit 21 includes a rotary member pair forming a nip portion (fixing nip) that nips and conveys the recording material S, and a heating portion (halogen lamp, ceramic heater, etc.) that heats the toner image on the recording material S. To be noted, in the present embodiment, the downstream side in the discharge direction in which the recording material S is discharged toward the discharge tray 23 by the discharge roller 22 will be referred to as the front side of the image forming apparatus 1, and the upstream side in the discharge direction will be referred to as the rear side of the image forming apparatus 1. The front side of the image forming apparatus 1 is the +X side in the X-axis direction, and the rear side is the −X side in the X-axis direction.

To be noted, each process unit P may be a process cartridge attachable to and detachable from the apparatus body 72. In addition, a configuration in which in each process unit P, only the developing unit 9 is a unit (developing cartridge) attachable to and detachable from the apparatus body 72 may be employed.

Image Forming Operation

The operation for forming the full-color image is as follows. The photosensitive drums 4Y, 4M, 4C, and 4K are rotationally driven at a predetermined speed in a counter-clockwise direction in FIG. 1. The transfer belt 12 is rotationally driven at a speed corresponding to the rotational speed (peripheral speed) of the photosensitive drums 4Y, 4M, 4C, and 4K in a rotational direction following the rotation of the photosensitive drums 4Y, 4M, 4C, and 4K.

The laser scanner unit LB is also driven. In each process unit P, the charging roller 5 uniformly charges the surface of the photosensitive drum 4 to a predetermined polarity and a predetermined potential in synchronization with the driving of the laser scanner unit LB. The laser scanner unit LB scans and exposes the charged surface of the photosensitive drums 4Y, 4M, 4C, and 4K respectively with laser light LY, LM, LC, and LK in accordance with the image signals of respective colors, and thus draws electrostatic latent images corresponding to the respective image signals on the surface of the photosensitive drums 4Y, 4M, 4C, and 4K. That is, the laser scanner unit LB exposes the photosensitive drum 4Y and the photosensitive drum 4M, and thus respectively forms a first electrostatic latent image and a second electrostatic latent image on the photosensitive drums 4Y and 4M. Similarly, the laser scanner unit LB exposes the photosensitive drum 4C and the photosensitive drum 4K, and thus respectively forms a third electrostatic latent image and a fourth electrostatic latent image on the photosensitive drums 4C and 4K.

The electrostatic latent image on each photosensitive drum 4 is developed by supply of toner to the photosensitive drum 4 by the developing roller 6 rotationally driven in the clockwise direction in FIG. 1 at a predetermined speed. A yellow toner image is formed on the photosensitive drum 4Y of the process unit PY by an image forming process of the electrophotographic system described above. Then, the yellow toner image is transferred onto the transfer belt 12 through primary transfer. Similarly, a magenta toner image is formed on the photosensitive drum 4M of the process unit PM. Then, the magenta toner image is transferred onto the transfer belt 12 through primary transfer so as to be superimposed on the yellow toner image on the transfer belt 12. A cyan toner image is formed on the photosensitive drum 4C of the process unit PC. Then, the cyan toner image is transferred onto the transfer belt 12 through primary transfer so as to be superimposed on the yellow and magenta toner images on the transfer belt 12. A black toner image is formed on the photosensitive drum 4K of the process unit PK. Then, the black toner image is transferred onto the transfer belt 12 through primary transfer so as to be superimposed on the yellow, magenta, and cyan toner images on the transfer belt 12.

In this manner, an unfixed full-color toner image of four colors of yellow, magenta, cyan, and black is formed on the transfer belt 12. Meanwhile, the recording materials S are fed one by one from the feeding tray 19 at predetermined control timing by the feeding roller 20 while being separated from each other. The recording material S is introduced to the secondary transfer portion 31 that is a contact portion between the secondary transfer roller 17 and the transfer belt 12 at a predetermined control timing. In the process of conveyance of the recording material S in the secondary transfer portion 31, the four-color toner image on the transfer belt 12 is transferred onto the recording material S. The recording material S onto which the toner image has been transferred is heated and pressurized by the fixing unit 21, and thus the toner image is fixed to the recording material S. The recording material S to which the toner image is fixed is discharged onto the discharge tray 23 by the discharge roller 22.

Layout, Attachment, and Detachment of Toner Cartridges

The layout of toner cartridges will be described with reference to FIG. 2. The image forming apparatus 1 includes cartridges 430Y, 430M, 430C, and 430K as replenishment containers attachable to and detachable from the apparatus body 72. In the description below, arbitrary one of the cartridges 430Y, 430M, 430C, and 430K will be described as a cartridge 430.

The cartridges 430Y, 430M, 430C, and 430K are arranged in a line in a direction intersecting with (orthogonal to) the direction in which the developing units 9 are arranged in a line. The cartridges 430Y, 430M, 430C, and 430K of the present embodiment are arranged in parallel in the Y-axis direction. The cartridges 430Y, 430M, 430C, and 430K will be respectively referred to as a first cartridge (first toner container), a second cartridge (second toner container), a third cartridge (third toner container), and a fourth cartridge (fourth toner container).

Figure 2A:
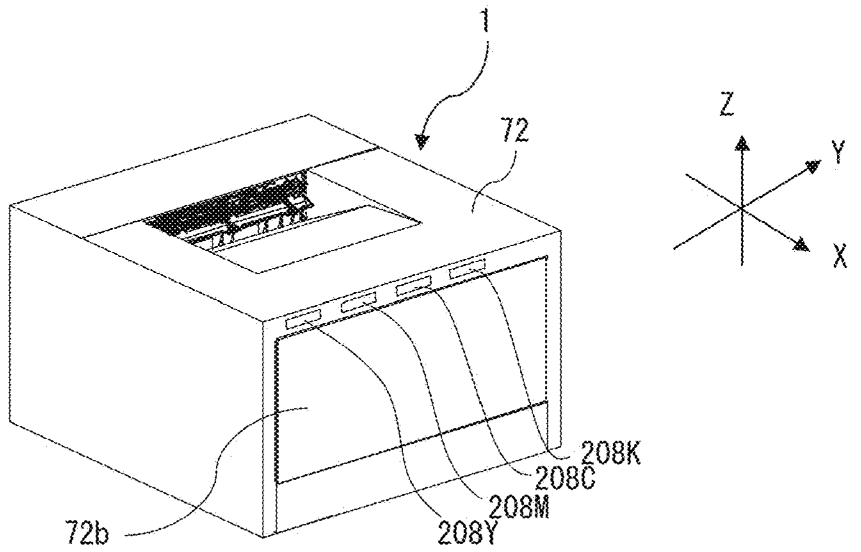
FIGS. 2A to 2C are each a perspective view of the image forming apparatus according to the first embodiment.
Figure 2B:
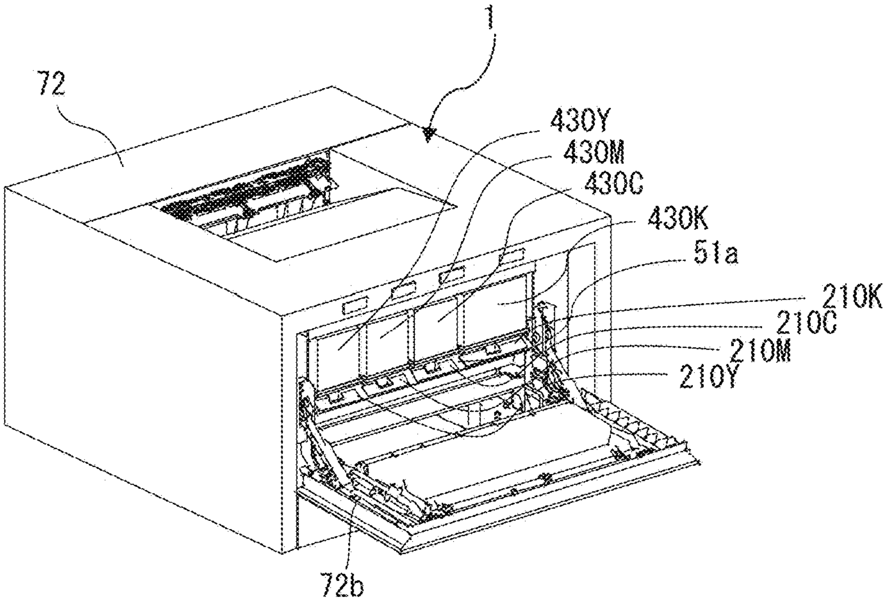
Figure 2C:
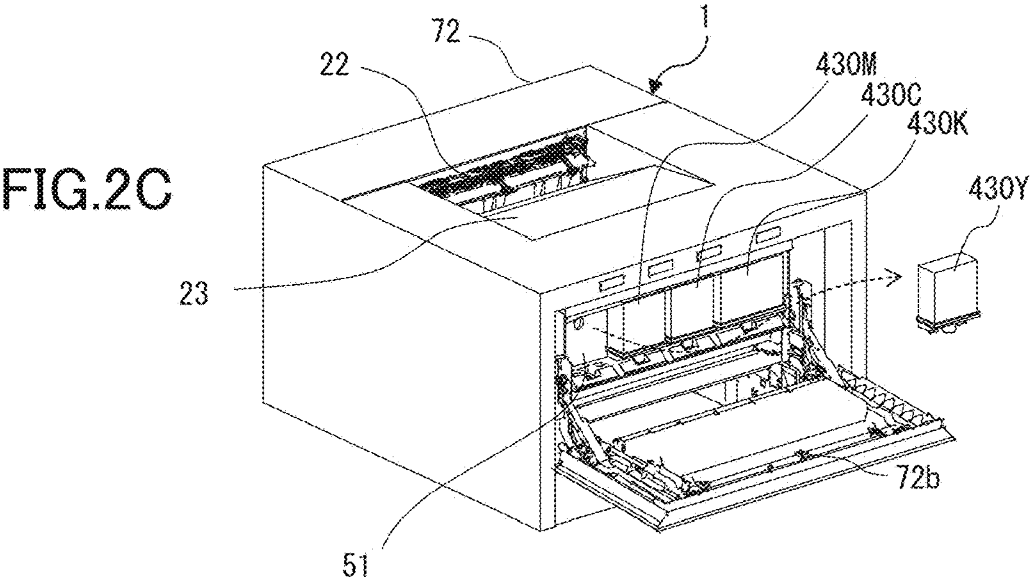

FIG. 2A is a perspective view of the image forming apparatus 1 in a state in which a front door 72*b* is closed. FIG. 2B is a perspective view of the image forming apparatus 1 in a state in which the front door 72*b* is open. FIG. 2C is a perspective view of the image forming apparatus 1 in a state in which the front door 72*b* is open and the cartridge 430Y has been detached from a cartridge holder 51.

As illustrated in FIG. 2B, the cartridges 430Y, 430M, 430C, and 430K are attached to an upper portion of the front side of the apparatus body 72 such that each cartridge 430 can be accessed by opening the front door 72*b*. In other words, each cartridge 430 is provided at an end portion of the apparatus body 72 on the downstream side in the discharge direction of the discharge roller 22. The front door 72*b* is an opening/closing member configured to be movable to a closed position (see FIG. 2A) to close an opening of the apparatus body 72 on the front side, and an open position (see FIG. 2B) to open the opening. When the front door 72*b* is moved to the open position, each cartridge 430 is exposed to the outside of the image forming apparatus 1 through the opening as illustrated in FIG. 2B.

The cartridge 430Y, 430M, 430C, and 430K are arranged in the Y-axis direction, and are configured to be attachable to and detachable from the apparatus body 72 in the X-axis direction as illustrated in FIG. 2C. As a result of this, the process units PY, PM, PC, and PK can be replenished with toner without detaching the process units PY, PM, PC, and PK from the apparatus body 72. As a result of each cartridge 430 being disposed on the front side of the image forming apparatus 1, each cartridge 430 can be accessed from the front side similarly to the case of collecting the recording material S discharged onto the discharge tray 23. In addition, since the cartridge holder 51 is provided on the front side of the image forming apparatus 1, the process units P are not exposed even after each cartridge 430 is detached (see FIG. 2C). Each cartridge 430 is accommodated in the apparatus body 72 in a state in which the front door 72*b* is closed.

As illustrated in FIG. 2A, indicators 208Y, 208M, 208C, and 208K (indicator portions, display portions) of respective colors are provided on the front side of the image forming apparatus 1. The indicators 208Y, 208M, 208C, and 208K are arranged in the Y-axis direction in correspondence with the cartridges 430Y, 430M, 430C, and 430K. The indicator 208Y (first indicator) is yellow, the indicator 208M (second indicator) is magenta, the indicator 208C (third indicator) is cyan, and the indicator 208K (fourth indicator) is black. The indicators 208Y, 208M, 208C, and 208K are each constituted by a light-emitting diode (LED) or a sticker of a color corresponding to the toner color of the corresponding one of the cartridges 430, and are each provided such that the cartridge 430 is not erroneously attached. In addition, the indicators 208Y, 208M, 208C, and 208K may be each imparted with a display function of displaying the amount of remaining toner of the corresponding one of the process units P (developing units 9).

As illustrated in FIG. 2B, the apparatus body 72 includes an inclined portion 51*a* provided on the lower side of the cartridge holder 51. The inclined portion 51*a* is an inclined surface facing diagonally upward toward the front side of the image forming apparatus 1. In other words, the inclined portion 51*a* is inclined downward (toward the −Z side) toward the front side (+X side) of the image forming apparatus 1 with respect to the horizontal surface. Labels 210 corresponding to the toner colors of the cartridges 430Y, 430M, 430C, and 430K are attached to the inclined portion 51*a*. When the user replaces each cartridge, since the labels 210 on the inclined portion 51*a* can be visually recognized, each cartridge 430 can be attached to a predetermined position.

Image Forming Unit

A toner conveyance mechanism from each cartridge 430 to corresponding one of the process units P will be described with reference to FIGS. 3A to 5B.

A unit including the cartridges 430Y, 430M, 430C, and 430K, the process units PY, PM, PC, and PK, and a toner conveyance path that will be described later will be referred to as an image forming unit 50. The toner conveyance path is a toner conveyance route (toner conveyance mechanism) from each cartridge 430 to corresponding one of the process units P.

Figure 3A:
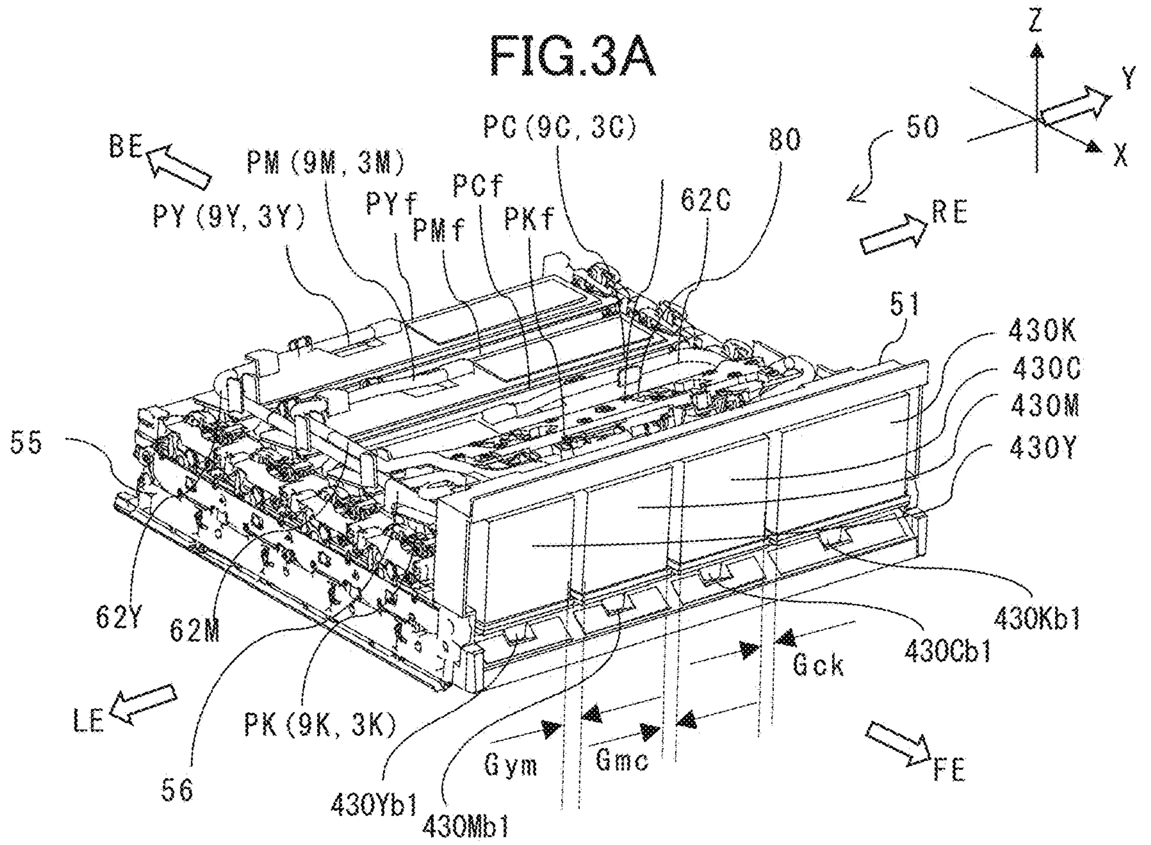
FIGS. 3A and 3B are each a perspective view of an image forming unit according to the first embodiment.
Figure 3B:
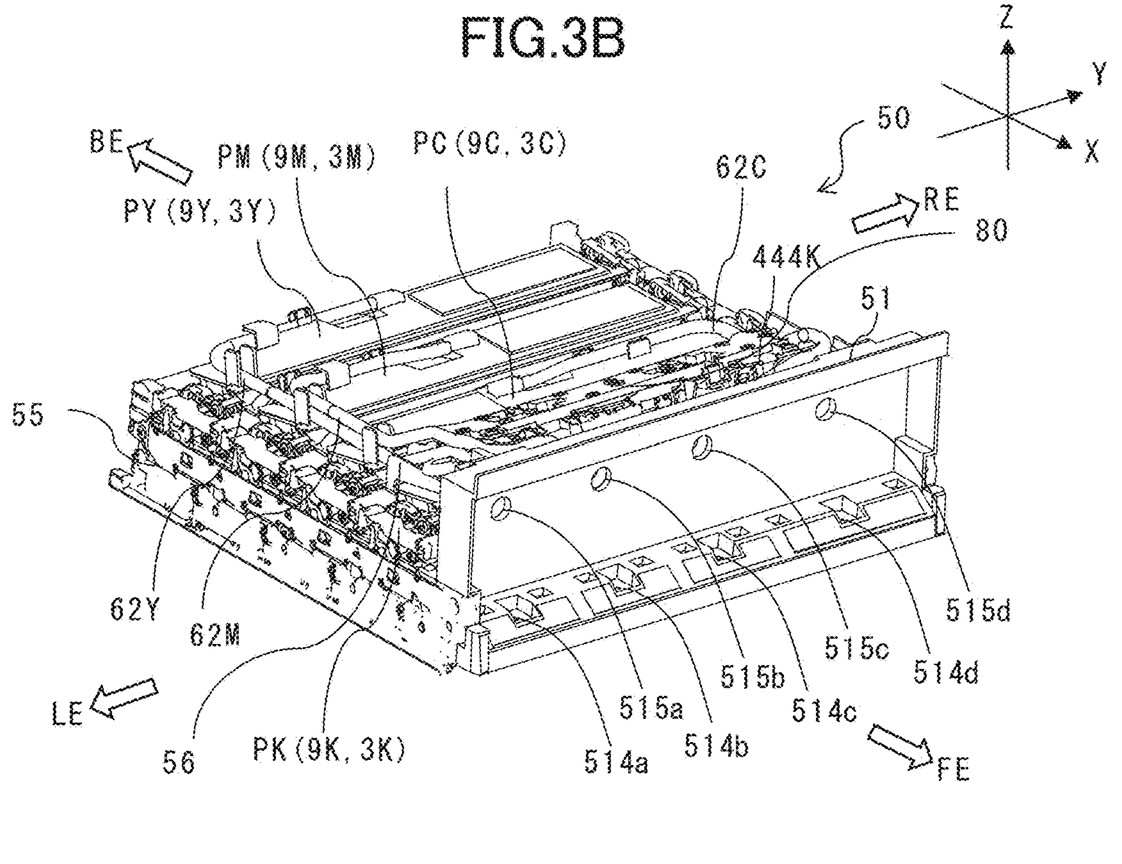
Figure 4A:
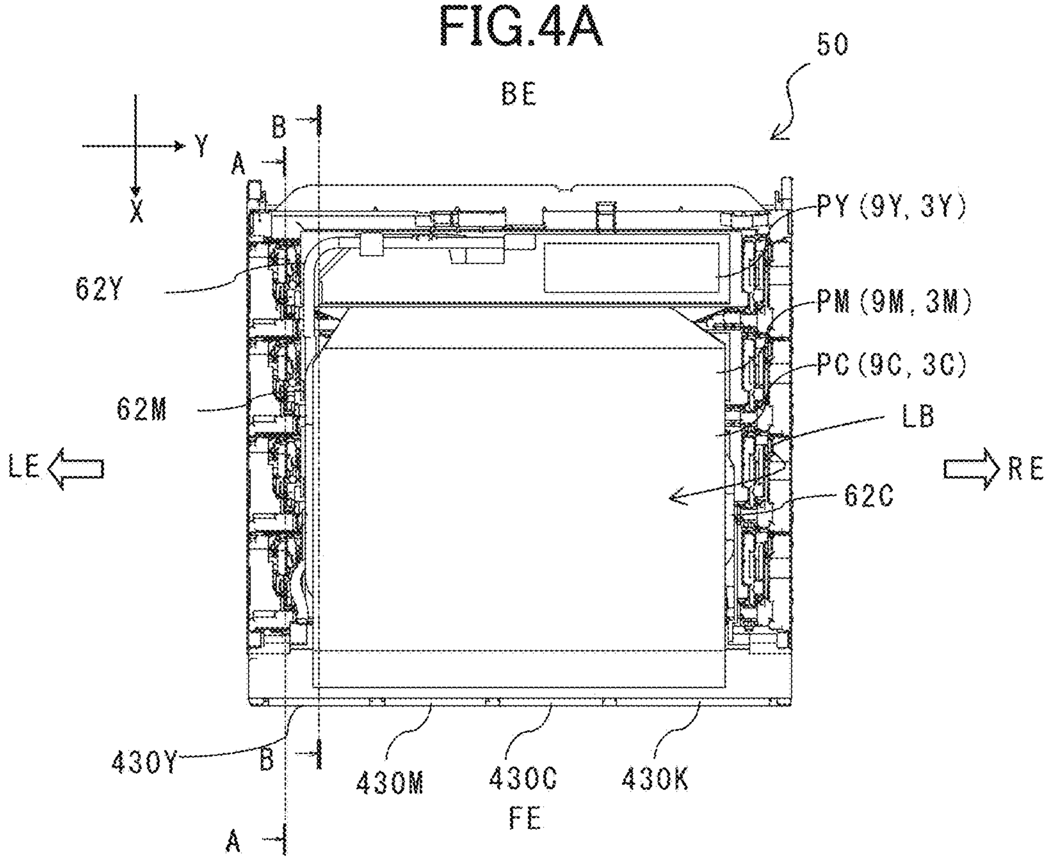
FIGS. 4A and 4B are each a top view of the image forming unit according to the first embodiment.
Figure 4B:
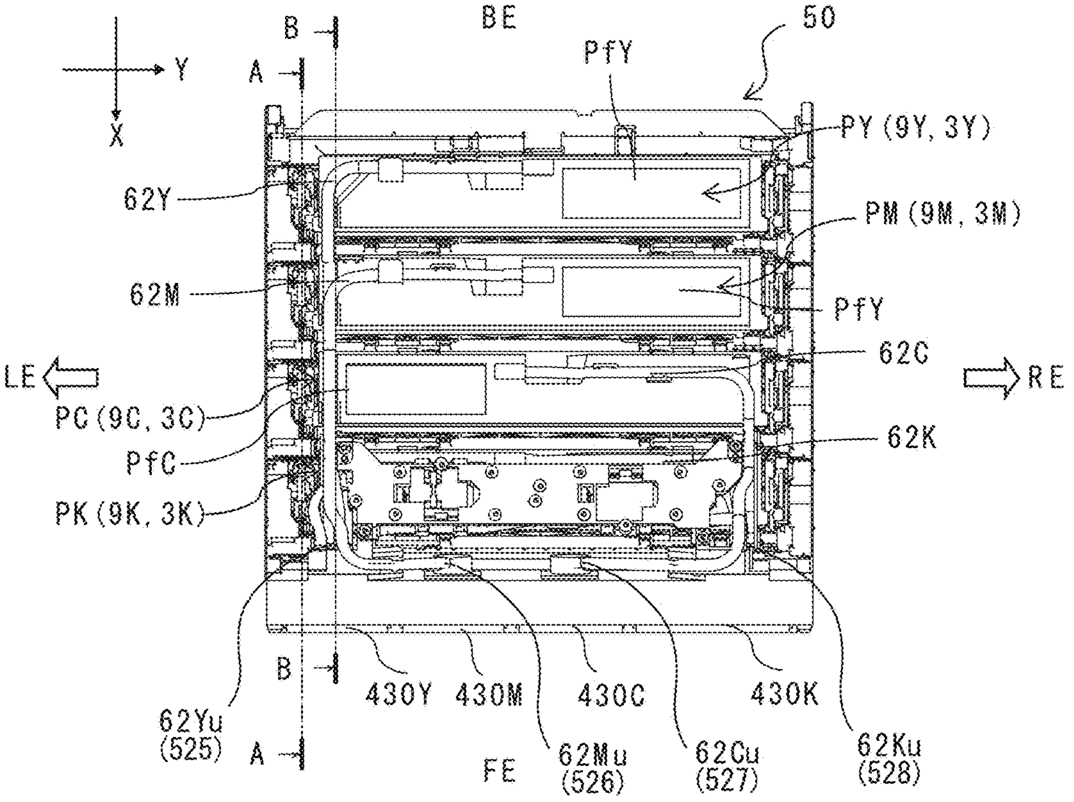
Figure 5A:
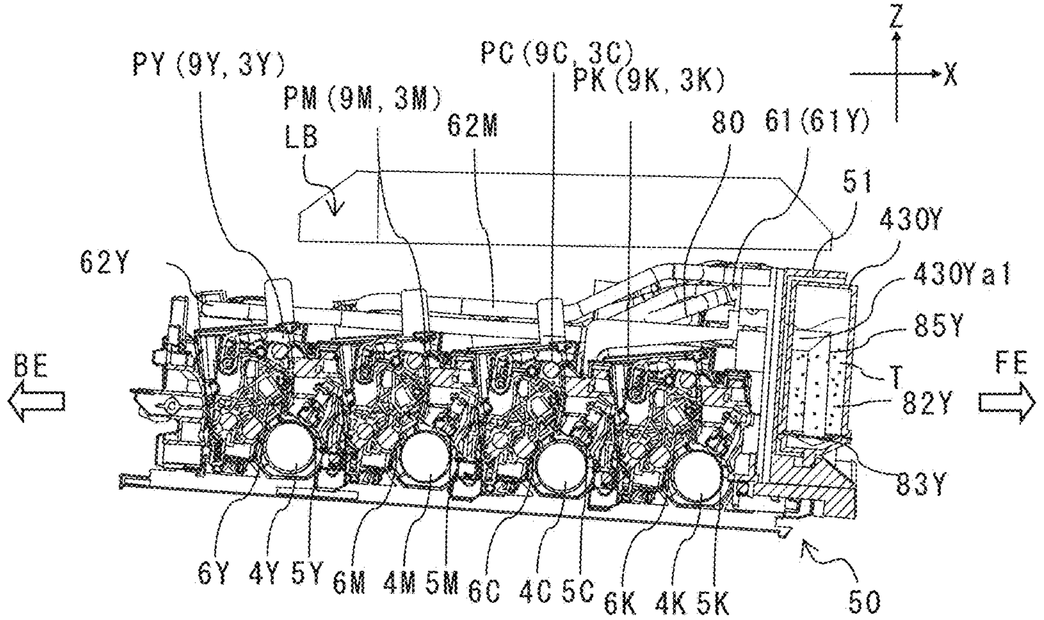
FIGS. 5A and 5B are each a section view of the image forming unit according to the first embodiment.
Figure 5B:
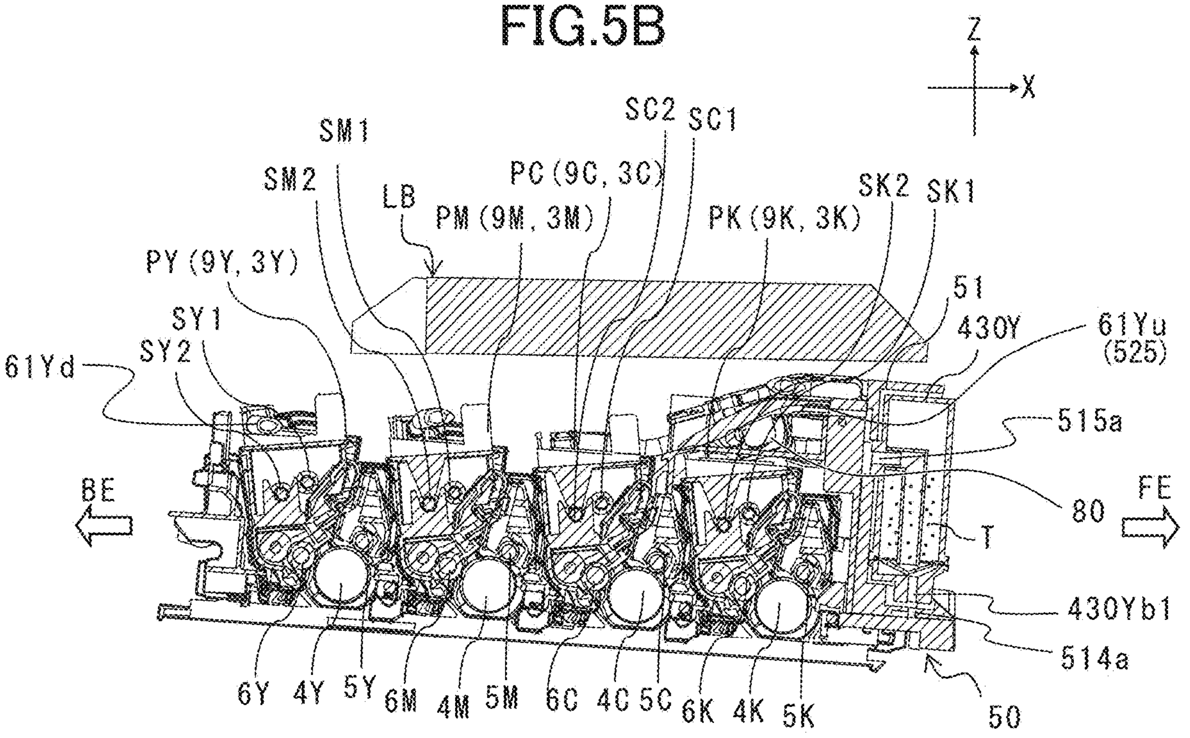

FIG. 3A is a perspective view of the image forming unit 50 in a state in which the cartridges 430Y, 430M, 430C, and 430K are attached thereto. FIG. 3B is a perspective view of the image forming unit 50 in a state in which the cartridges 430Y, 430M, 430C, and 430K have been detached therefrom. FIG. 4A is a top view of the laser scanner unit LB and the image forming unit 50. FIG. 4B is a top view of the image forming unit 50. FIGS. 5A and 5B are respectively section views illustrating an A-A cross-section and a B-B cross-section of FIG. 4A. In FIGS. 3A to 5B, the front side (+X side) of the image forming apparatus 1 is denoted by "FE", and the rear side (−X side) thereof is denoted by "BE". When the image forming apparatus 1 is viewed from the front side to the rear side, the right end side (+Y side) thereof is denoted by "RE", and the left end side (−Y side) thereof is denoted by "LE".

As illustrated in FIG. 3A, the process units PY, PM, PC, and PK are arranged in parallel in the X direction in the image forming unit 50. Each process unit P is attached to a tray 55. The cartridge holder 51 is provided in front of the tray 55, and the cartridges 430Y, 430M, 430C, and 430K are attached to the cartridge holder 51. The cartridges 430Y, 430M, 430C, and 430K are arranged in parallel in the Y direction.

That is, the apparatus body 72 includes the cartridge holder 51 serving as a holding member that holds each cartridge 430 (attached portion to which the cartridges 430 are attached). The cartridge holder 51 defines an attachment space to which each cartridge 430 is attached. The attachment space in the present embodiment is a space between the cartridge holder 51 and the front door 72*b* in the closed state (FIGS. 1 and 2A). The cartridge holder 51 is fixed to a frame body of the apparatus body 72. The cartridge holder 51 may be part of the frame body of the apparatus body 72.

A pump unit 80 is provided above the process unit PK. The pump unit 80 is supported by a support member 56, and is attached to the cartridge holder 51. The pump unit 80 includes four air pumps for supplying air respectively to the cartridges 430Y, 430M, 430C, and 430K. As each pump in the pump unit 80, a displacement pump such as a reciprocating pump or a rotary pump is used. The reciprocating pump is a pump that performs suction and ejection by a reciprocating motion of a piston, a plunger, or the like, and examples thereof include a piston pump, a plunger pump, and a diaphragm pump. The rotary pump is a pump that performs suction and ejection by a rotational motion of a gear, a rotor, or the like, and examples thereof include a gear pump, a screw pump, and a vane pump.

Although the pump unit 80 is provided in the image forming unit 50 in the present embodiment, the pump unit 80 may be provided in each cartridge 430 or other part of the apparatus body 72. In addition, the pump unit 80 (air pump) is an example of an air supplying portion or a supply unit that supplies air to convey toner from each cartridge 430 to the developing unit 99, and for example, a fan (axial fan, sirocco fan, etc.) may be used as the air supplying portion.

Cartridge Holder

Figure 6A:
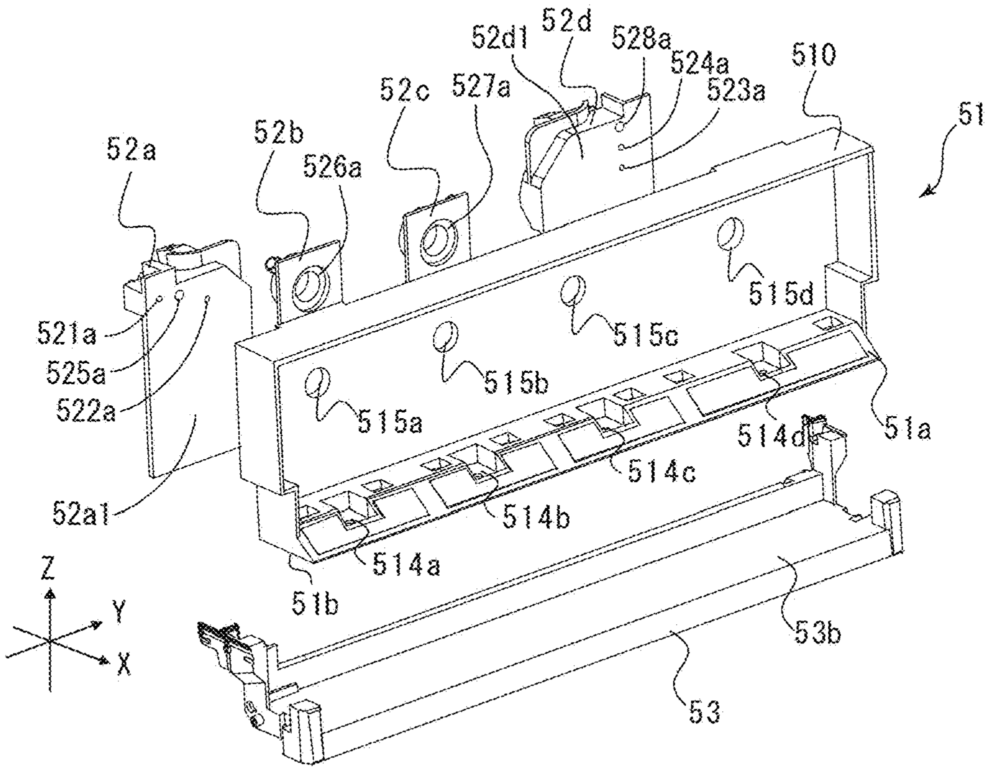
FIGS. 6A and 6B are each an exploded view of a cartridge holder according to the first embodiment.
Figure 6B:
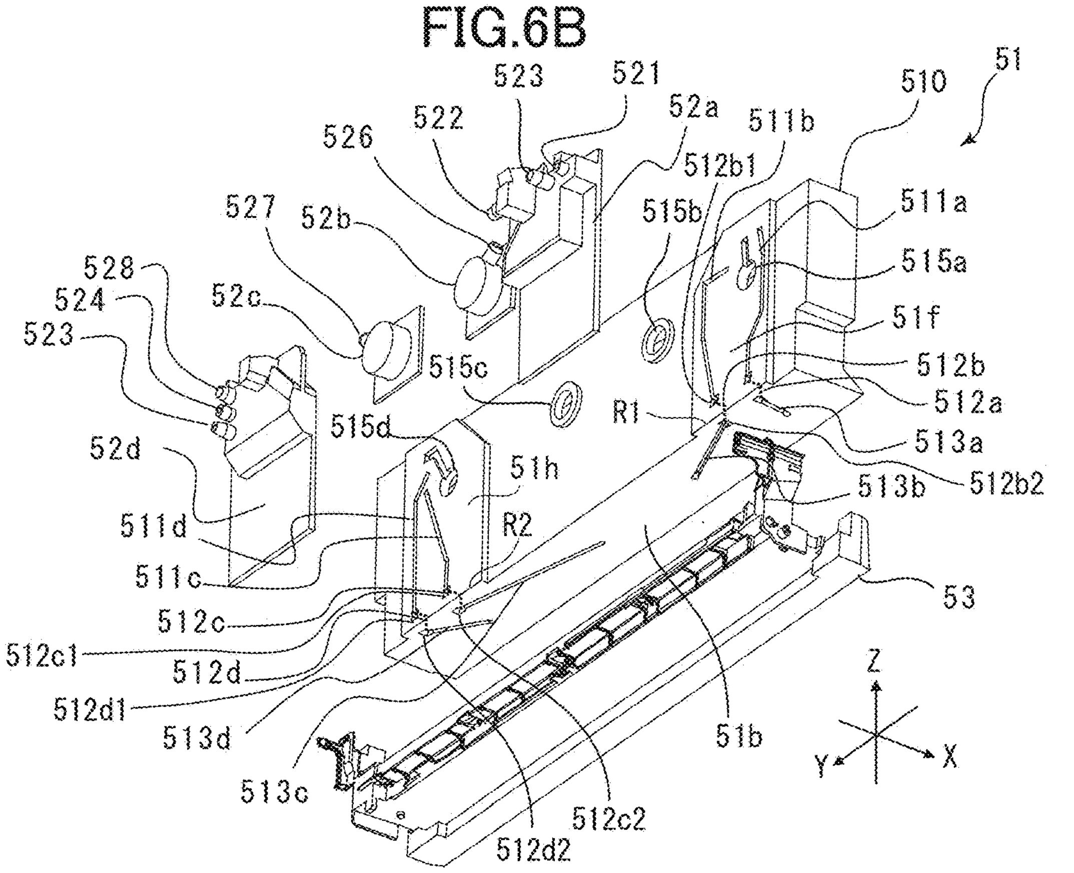
Figure 7A:
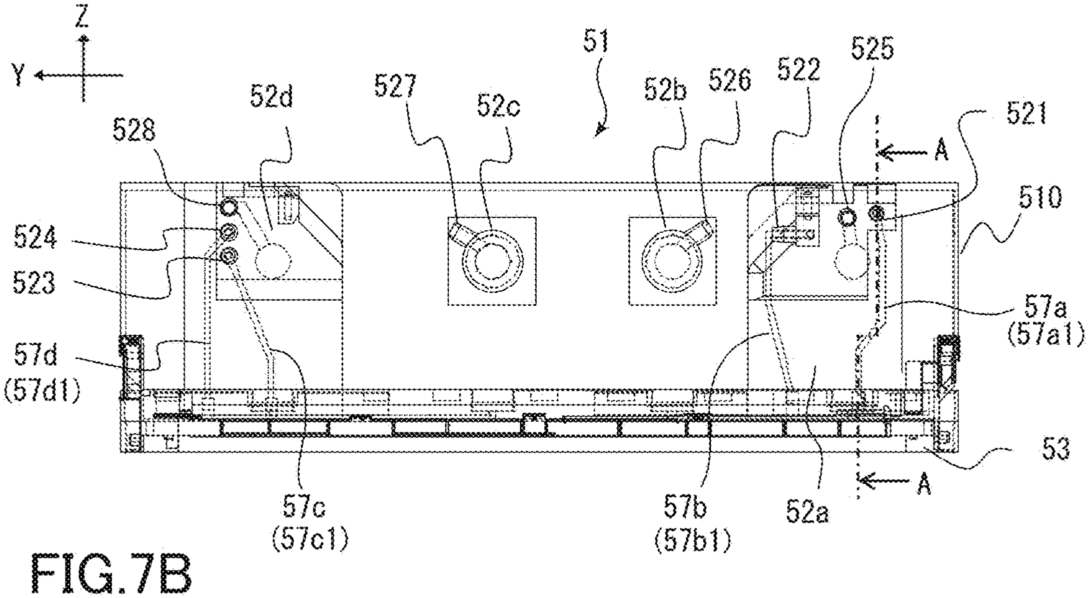
FIG. 7A is a back view of the cartridge holder according to the first embodiment.
Figure 7B:
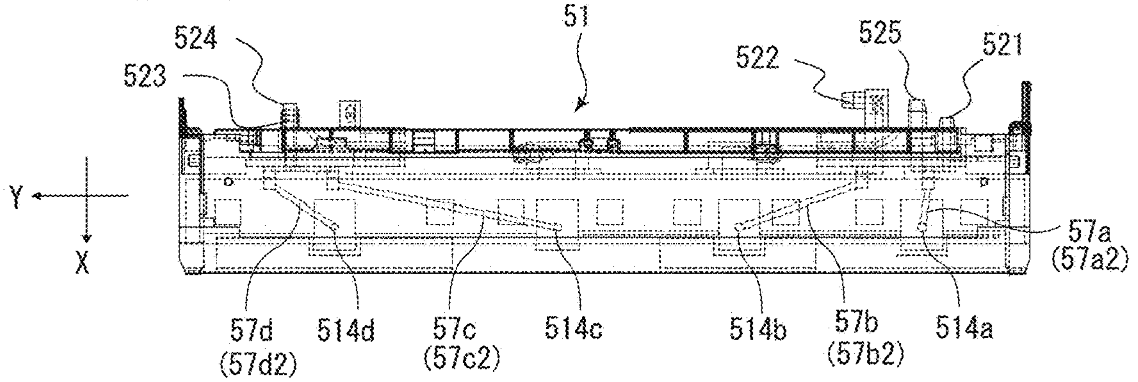
FIG. 7B is a bottom view of the cartridge holder according to the first embodiment.
Figure 7C:
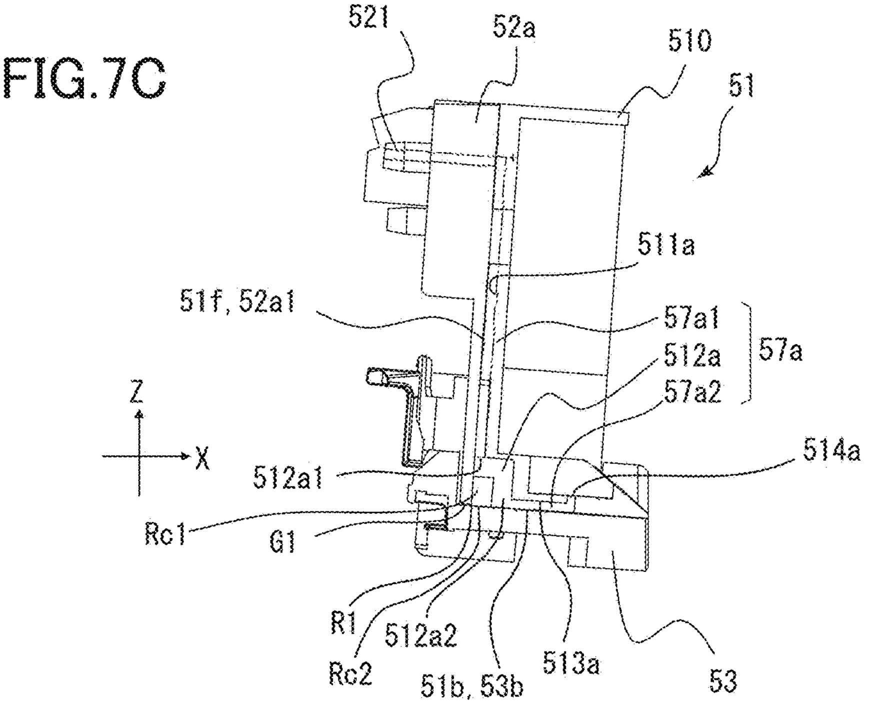
FIG. 7C is a section view of the cartridge holder according to the first embodiment.

FIG. 6A is an exploded perspective view (as viewed from the front side) of the cartridge holder 51. FIG. 6B is an exploded perspective view (as viewed from the rear side) of the cartridge holder 51. FIG. 7A is a diagram illustrating the cartridge holder 51 as viewed from the rear side (−X side). FIG. 7B is a diagram (bottom view) illustrating the cartridge holder 51 as viewed from the lower side (−Z side). FIG. 7C is a section view of the cartridge holder 51 taken along a line A-A of FIG. 7A.

As illustrated in FIGS. 6A to 7B, the cartridge holder 51 includes a holder body 510, connecting members 52*a*, 52*b*, 52*c*, and 52*d*, and a bottom cover 53. The holder body 510 is an example of a first member, the connecting member 52*a* is an example of a second member, and the bottom cover 53 is an example of a third member. The holder body 510, the connecting members 52*a*, 52*b*, 52*c*, and 52*d*, and the bottom cover 53 are formed as one unit joined by a method such as gluing. The holder body 510, the connecting members 52*a*, 52*b*, 52*c*, and 52*d*, and the bottom cover 53 each may be a molded resin product formed by a method such as injection molding.

The cartridge holder 51 is an example of a flow passage forming portion that forms a flow passage in which air flows to supply toner from the cartridge 430 serving as a replenishment container to corresponding one of the developing containers 3 (accommodating portions). The cartridge holder 51 of the present embodiment defines an attachment space to which the cartridges 430 are attached, serves as a holding member that holds the cartridges 430, and serves as a flow passage forming portion that forms a flow passage for air.

The cartridge holder 51 has air connecting ports 521, 522, 523, and 524, and air discharge ports 514*a*, 514*b*, 514*c*, and 514*d*. Further, the cartridge holder 51 has toner inlet ports 515*a*, 515*b*, 515*c*, and 515*d*, and toner connecting ports 525, 526, 527, and 528.

The air connecting port 521 and the air discharge port 514*a* are connected to each other through an air flow passage 57*a* in the cartridge holder 51. The air connecting port 522 and the air discharge port 514*b* are connected to each other through an air flow passage 57*b* in the cartridge holder 51. The air connecting port 523 and the air discharge port 514*c* are connected to each other through an air flow passage 57*c* in the cartridge holder 51. The air connecting port 524 and the air discharge port 514*d* are connected to each other through an air flow passage 57*d* in the cartridge holder 51. These air flow passages 57*a*, 57*b*, 57*c*, and 57*d* are each a flow path through which the air supplied from the pump unit 80 (air supplying portion) flows toward each cartridge 430 (replenishment container).

The cartridge holder 51 is configured such that the air supplied from the pump unit 80 flows through an upstream portion 57*a*1 (first flow passage), an inner flow passage 512*a* (second flow passage), and a downstream portion 57*a*2 (third flow passage) of the air flow passage 57*a* that will be described later in this order. In addition, the cartridge holder 51 is configured such that the air supplied from the pump unit 80 flows through an upstream portion 57*b*1 (fourth flow passage), an inner flow passage 512*b* (fifth flow passage), and a downstream portion 57*b*2 (sixth flow passage) of the air flow passage 57*b* in this order as a path independent from the air flow passage 57*a*. Similarly, the cartridge holder 51 is configured such that the air supplied from the pump unit 80 flows through an upstream portion 57*c*1, an inner flow passage 512*c*, and a downstream portion 57*c*2 of the air flow passage 57*c* in this order. In addition, the cartridge holder 51 is configured such that the air supplied from the pump unit 80 flows through an upstream portion 57*d*1, an inner flow passage 512*d*, and a downstream portion 57*d*2 of the air flow passage 57*d* in this order as a path independent from the air flow passage 57*c*.

In the case where the cartridge 430Y is attached to the cartridge holder 51, the air discharge port 514*a* is connected to an inlet port 430Yb1 (described later) of the cartridge 430Y, and the toner inlet port 515*a* is connected to a discharge port 430Ya1 of the cartridge. In the case where the cartridge 430M is attached to the cartridge holder 51, the air discharge port 514*b* is connected to an inlet port 430Mb1 (described later) of the cartridge 430M, and the toner inlet port 515*b* is connected to a discharge port 430Ma1 of the cartridge. In the case where the cartridge 430C is attached to the cartridge holder 51, the air discharge port 514*c* is connected to an inlet port 430Cb1 (described later) of the cartridge 430C, and the toner inlet port 515*c* is connected to a discharge port 430Ca1 of the cartridge. In the case where the cartridge 430K is attached to the cartridge holder 51, the air discharge port 514*d* is connected to an inlet port 430Kb1 (described later) of the cartridge 430K, and the toner inlet port 515*d* is connected to a discharge port 430Ka1 of the cartridge.

The toner inlet port 515*a* and the toner connecting port 525 are connected to each other through a toner flow passage in the cartridge holder 51. The toner inlet port 515*b* and the toner connecting port 526 are connected to each other through a toner flow passage in the cartridge holder 51. The toner inlet port 515*c* and the toner connecting port 527 are connected to each other through a toner flow passage in the cartridge holder 51. The toner inlet port 515*d* and the toner connecting port 528 are connected to each other through a toner flow passage in the cartridge holder 51. These toner flow passages are each a path through which air including toner discharged from each cartridge 430 flows toward corresponding one of the developing units 9.

That is, the cartridge holder 51 includes, as structures for conveying toner from the cartridge 430Y by using air, an air flow passage 57*a* including the air connecting port 521 and the air discharge port 514*a*, and a toner flow passage including the toner inlet port 515*a* and the toner connecting port 525. The cartridge holder 51 includes, as structures for conveying toner from the cartridge 430M by using air, an air flow passage 57*b* including the air connecting port 522 and the air discharge port 514*b*, and a toner flow passage including the toner inlet port 515*b* and the toner connecting port 526. The cartridge holder 51 includes, as structures for conveying toner from the cartridge 430C by using air, an air flow passage 57*c* including the air connecting port 523 and the air discharge port 514*c*, and a toner flow passage including the toner inlet port 515*c* and the toner connecting port 527. The cartridge holder 51 includes, as structures for conveying toner from the cartridge 430K by using air, an air flow passage 57*d* including the air connecting port 524 and the air discharge port 514*d*, and a toner flow passage including the toner inlet port 515*d* and the toner connecting port 528.

The air connecting port 521 is an example of a first opening portion for receiving air supplied from the air supplying portion. The air discharge port 514*a* is an example of a second opening portion connected to the opening portion (inlet port 430Yb1 that will be described later) provided in the replenishment container for taking in air.

Air Supply Path from Pump to Cartridge

The air supply path from the pump unit 80 to each cartridge 430 will be described in detail with reference to FIGS. 5A to 7C.

As illustrated in FIGS. 5A and 5B, the four ejection ports of the pump unit 80 are respectively connected to the air connecting ports 521, 522, 523, and 524 of the cartridge holder 51 via four air supply pipes 61. Although only an air supply pipe 61Y connected to the air connecting port 521 is illustrated in FIGS. 5A and 5B, the other three ejection ports of the pump unit 80 are respectively connected to the air connecting ports 522, 523, and 524 via respective three air supply pipes 61 corresponding thereto. The air supply pipe 61Y is a flexible tubular member (tube) having one end connected to the pump unit 80 (air supplying portion) and another end connected to the air connecting port 521 (first opening portion).

The outer diameter of the air connecting port 521 is slightly larger than the inner diameter of an end portion 61Yu (FIG. 5B) of the air supply pipe 61Y The end portion 61Yu of the air supply pipe 61Y is connected by the air connecting port 521 by press-fitting. As a result of this, leakage of air from a connecting portion between the air supply pipe 61Y and the air connecting port 521 can be suppressed. Similarly, the outer diameter of the air connecting ports 522, 523, and 524 is slightly larger than the inner diameter of the end portion of the corresponding one of the air supply pipes 61.

1. Air Supply Path to Cartridge 430Y

First, the details of the air supply path to the cartridge 430Y will be described. As illustrated in FIGS. 6A and 6B, the air connecting port 521 is provided in the connecting member 52*a*. The holder body 510 (first member) includes a flat surface portion 51*f* (first surface, first flat surface portion) opposing the connecting member 52*a*. The connecting member 52*a* (second member) includes a flat surface portion 52*a*1 (third surface, third flat surface portion) opposing the holder body 510. In the present embodiment, the connecting member 52*a* is joined to the holder body 510 by the flat surface portions 51*f* and 52*a*1 together by using an adhesive. The flat surface portion 51*f* of the holder body 510 and the flat surface portion 52*a*1 of the connecting member 52*a* are substantially parallel surfaces. The flat surface portions 51*f* and 52*a*1 of the present embodiment extend in a direction intersecting with the X-axis direction. The flat surface portion 51*f* of the holder body 510 is a surface facing toward one side (−X side) in the X-axis direction, and the flat surface portion 52*a*1 of the connecting member 52*a* is a surface facing toward the other side (+X side) in the X-axis direction.

The flat surface portion 51*f* of the holder body 510 has a groove portion 511*a* (first groove portion). The groove portion 511*a* is a groove shape (recess shape) recessed in a direction away from the flat surface portion 52*a*1 (+X direction in the present embodiment) in a direction in which the flat surface portion 51*f* and the flat surface portion 52*a*1 of the connecting member 52*a* oppose each other (direction orthogonal to the flat surface portion 52*a*1, approximate X-axis direction). When the holder body 510 and the connecting member 52*a* are joined together, the groove portion 511*a* is covered by the flat surface portion 52*a*1 of the connecting member 52*a*. As a result of this, the upstream portion 57*a*1 (FIGS. 7A and 7C, first flow passage) of the air flow passage 57*a* is formed.

In other words, one of the first surface and the third surface is provided with a first groove portion recessed in a direction away from the other of the first surface and the third surface in a first direction in which the first surface and the third surface oppose each other. The first groove portion is covered by the first member or the second member including the other of the first surface and the third surface, so that a first part of the flow passage is formed. The groove portion 511*a* serving as a first groove portion of the present embodiment is provided in the flat surface portion 51*f* of the holder body 510 serving as a first surface of the first member, but as will be described later in a second embodiment, the first groove portion may be provided in the flat surface portion 52*a*1 of the connecting member 52*a* (third surface of the second member). That is, the upstream portion 57*a*1 (first flow passage) of the air flow passage 57*a* is a space defined in a gap between the flat surface portion 51*f* (first surface) of the holder body 510 and the flat surface portion 52*a*1 (third surface) of the connecting member 52*a*. The "gap" may be a gap defined as a result of a groove portion provided in one of the first surface and the third surface being covered by the other of the first surface and the third surface, or a gap defined as a result of groove portions respectively provided in the first surface and the third surface opposing each other.

At least part of the groove portion 511*a* extends in a direction intersecting with a lower surface portion 51*b* (second surface, second flat surface portion) that will be described later. As a result of this, the air flow passage 57*a* can be extended in a direction different from an in-plane direction of the lower surface portion 51*b*. The groove portion 511*a* of the present embodiment extends approximately along the Z-axis direction (FIG. 7A). To be noted, the extension direction of the groove portion 511*a* may be changed within the in-plane direction of the flat surface portion 51*f*, and the groove portion 511*a* may be bent once or more times within the surface of the flat surface portion 51*f*.

In addition, a hole 521*a* (FIG. 6A) is provided at a position in the flat surface portion 52*a*1 of the connecting member 52*a* opposing an end portion (upper end portion) of the groove portion 511*a*. The hole 521*a* communicates with the air connecting port 521 through a flow passage formed in the interior the connecting member 52*a*. When the holder body 510 and the connecting member 52*a* are joined together, the hole 521*a* opposes an end portion of the groove portion 511*a*. As a result of this, the air connecting port 521 communicates with the upstream portion 57*a*1 of the air flow passage 57*a*.

In addition, the holder body 510 (first member) includes a lower surface portion 51*b* serving as a flat surface portion (second surface, second surface portion) opposing the bottom cover 53. The lower surface portion 51*b* is a flat surface portion intersecting with the flat surface portion 51*f* at a ridge portion R1. The bottom cover 53 (third member) includes an upper surface portion 53*b* serving as a flat surface portion (fourth surface, fourth flat surface portion) opposing the holder body 510. In the present embodiment, the bottom cover 53 is joined to the holder body 510 as a result of the upper surface portion 53*b* being glued to the lower surface portion 51*b* of the holder body 510. The lower surface portion 51*b* of the holder body 510 and the upper surface portion 53*b* of the bottom cover 53 are substantially parallel surfaces. The lower surface portion 51*b* and the upper surface portion 53*b* of the present embodiment extend in a direction intersecting with the Z-axis direction. The lower surface portion 51*b* of the holder body 510 is a surface facing one side (−Z side, lower side) in the Z-axis direction, and the upper surface portion 53*b* of the bottom cover 53 is a surface facing the other side (+Z side, upper side) in the Z-axis direction.

A groove portion 513*a* (second groove portion) is provided in the lower surface portion 51*b* of the holder body 510. The groove portion 513*a* is a groove shape (recess shape) recessed in a direction away from the upper surface portion 53*b* (+Z direction in the present embodiment) in a direction in which the lower surface portion 51*b* and the upper surface portion 53*b* of the bottom cover 53 oppose each other (direction orthogonal to the lower surface portion 51*b*, approximate Z-axis direction). When the holder body 510 and the bottom cover 53 are joined together, the groove portion 513*a* is covered by the upper surface portion 53*b* of the bottom cover 53. As a result of this, the downstream portion 57*a*2 (FIGS. 7B and 7C, second flow passage) of the air flow passage 57*a* is formed.

In other words, one of the second surface and the fourth surface is provided with a second groove portion recessed in a direction away from the other of the second surface and the fourth surface in a second direction in which the second surface and the fourth surface oppose each other. The second groove portion is covered by the first member or the third member including the other of the second surface and the fourth surface, so that a second part of the flow passage is formed. The groove portion 513*a* serving as a second groove portion of the present embodiment is provided in the lower surface portion 51*b* of the holder body 510 serving as a second surface of the first member, but as will be described later in the second embodiment, the second groove portion may be provided in the upper surface portion 53*b* of the bottom cover 53 (fourth surface of the third member). That is, the downstream portion 57*a*2 (third flow passage) of the air flow passage 57*a* is a space defined in a gap between the lower surface portion 51*b* (second surface) of the holder body 510 and the upper surface portion 53*b* (fourth surface) of the bottom cover 53. The "gap" may be a gap defined as a result of a groove portion provided in one of the second surface and the fourth surface being covered by the other of the second surface and the fourth surface, or a gap defined as a result of groove portions respectively provided in the second surface and the fourth surface opposing each other.

At least part of the groove portion 513*a* extends in a direction intersecting with the flat surface portion 51*f* (first surface, first flat surface portion). As a result of this, the air flow passage 57*a* can be extended in a direction different from an in-plane direction of the flat surface portion 51*f*. The groove portion 513*a* of the present embodiment extends approximately in the X-axis direction (FIG. 7B) along the lower surface portion 51*b*. To be noted, the extension direction of the groove portion 513*a* may be changed within the in-plane direction of the lower surface portion 51*b*, and the groove portion 513*a* may be bent once or more times within the surface of the lower surface portion 51*b*.

In addition, an end portion of the groove portion 513*a* (end portion on the +X side) communicates with the air discharge port 514*a* through a hole provided in the holder body 510 (FIG. 7C). Therefore, when the holder body 510 and the bottom cover 53 are joined together, the downstream portion 57*a*2 of the air flow passage 57*a* communicates with the air discharge port 514*a*.

As described above, by providing the groove portions 511*a* and 513*a* respectively on two surfaces (flat surface portion 51*f* and lower surface portion 51*b*) of the holder body 510, the air flow passage 57*a* having a bent shape that cannot be realized within one plane can be formed. Specifically, in the present embodiment, the air connecting port 521 and the air discharge port 514*a* provided at different positions in the Z-axis direction can be interconnected by the air flow passage 57*a* by providing the groove portion 511*a* extending approximately in the Z-axis direction in the flat surface portion 51*f*. In addition, the air connecting port 521 and the air discharge port 514*a* provided at different positions in the X-axis direction can be interconnected by the air flow passage 57*a* by providing the groove portion 513*a* extending approximately in the X-axis direction in the lower surface portion 51*b*.

Further, in the holder body 510, an inner flow passage 512*a* communicating with the groove portion 511*a* and the groove portion 513*a* are provided. The inner flow passage 512*a* is formed in a tunnel shape in the interior of the holder body 510. One end of the inner flow passage 512*a* is open to the groove portion 511*a* at a position away in the Z-axis direction from the ridge portion R1 between the flat surface portion 51*f* and the lower surface portion 51*b* of the holder body 510. The other end of the inner flow passage 512*a* is open to the groove portion 513*a* at a position away in the X-axis direction from the ridge portion R1 of the holder body 510. As a result of this, the airtightness of the air flow passage 57*a* can be more easily improved. An opening portion 512*a*1 of the inner flow passage 512*a* to the groove portion 511*a* is a first connecting portion where the upstream portion 57*a*1 (first flow passage) and the inner flow passage 512*a* (second flow passage) of the air flow passage 57*a* are connected. An opening portion 512*a*2 of the inner flow passage 512*a* to the groove portion 513*a* is a second connecting portion where the inner flow passage 512*a* (second flow passage) and the downstream portion 57*a*2 (third flow passage) of the air flow passage 57*a* are connected.

In other words, the inner flow passage 512*a* is a path extending in the interior of the holder body 510 while bypassing the ridge portion R1, and is configured to interconnect the upstream portion 57*a*1 and the downstream portion 57*a*2 of the air flow passage 57*a*. To be noted, an end portion 511*a*1 (FIG. 7C) of the groove portion 511*a* on the side closer to the ridge portion R1 is provided at a position away from the ridge portion R1 in the Z-axis direction. An end portion 513*a*1 (FIG. 7C) of the groove portion 513*a* on the side closer to the ridge portion R1 is provided at a position away from the ridge portion R1 in the X-axis direction. That is, the groove portions 511*a* and 513*a* are both formed to not reach the ridge portion R1.

It is preferable that, as viewed in the first direction (approximate X-axis direction) in which the flat surface portion 51*f* of the holder body 510 and the flat surface portion 52*a*1 of the connecting member 52*a* oppose each other, a region Rc1 where the flat surface portion 51*f* and the flat surface portion 52*a*1 abut each other is provided between the groove portion 511*a* and the ridge portion R1. That is, it is preferable that the upstream portion 57*a*1 (first flow passage) of the air flow passage 57*a* and the ridge portion R1 are separated by the region Rc1 where the flat surface portion 51*f* (first surface) and the flat surface portion 52*a*1 (third surface) abut each other. In addition, it is preferable that, as viewed in the second direction (approximate Z-axis direction) in which the lower surface portion 51*b* of the holder body 510 and the upper surface portion 53*b* of the bottom cover 53 oppose each other, a region Rc2 where the lower surface portion 51*b* and the upper surface portion 53*b* abut each other is provided between the groove portion 513*a* and the ridge portion R1. That is, it is preferable that the downstream portion 57*a*2 (third flow passage) of the air flow passage 57*a* and the ridge portion R1 are separated by the region Rc2 where the lower surface portion 51*b* (second surface) and the upper surface portion 53*b* (fourth surface) abut each other. As a result of this, the airtightness of the air flow passage 57*a* can be more reliably improved. To be noted, it is more preferable that the entire periphery of the groove portion 511*a* is surrounded by the contact region between the flat surface portions 51*f* and 52*a*1 as viewed in the first direction. In addition, it is more preferable that the entire periphery of the groove portion 513*a* is surrounded by the contact region between the lower surface portion 51*b* and the upper surface portion 53*b* as viewed in the second direction.

The inner flow passage 512*a* of the present embodiment is formed in an approximate L shape including a portion extending approximately in the +X direction from the end portion 511*a*1 of the groove portion 511*a* on the side closer to the ridge portion R1 and a portion extending approximately in the +Z direction from the end portion 513*a*1 of the groove portion 513*a* on the side closer to the ridge portion R1.

To be noted, as a method for molding the holder body 510, performing injection molding with the approximate X-axis direction as an opening/closing direction of the mold on the basis of the posture in which the holder body 510 is attached to the apparatus body 72 can be considered. In this case, although the groove portion 513*a*, part of the inner flow passage 512*a*, and the air discharge port 514*a* become undercuts, but these parts can be released from the mold by using, for example, a slide core that slides in the Z-axis direction.

2. Air Supply Path to Cartridge 430M

The air supply path to the cartridge 430M is basically the same as the air supply path to the cartridge 430Y.

As illustrated in FIGS. 6A and 6B, the air connecting port 522 is provided in the connecting member 52*a*. The flat surface portion 51*f* of the holder body 510 has a groove portion 511*b*. When the holder body 510 and the connecting member 52*a* are joined together, the groove portion 511*b* is covered by the flat surface portion 52*a*1 of the connecting member 52*a*. As a result of this, the upstream portion of the air flow passage 57*b* (first portion of flow path) is formed.

The groove portion 511*b* of the present embodiment extends approximately along the Z-axis direction (FIG. 7A). To be noted, the extension direction of the groove portion 511*b* may be changed within the in-plane direction of the flat surface portion 51*f*, and the groove portion 511*b* may be bent once or more times within the surface of the flat surface portion 51*f*.

In addition, a hole 522*a* (FIG. 6A) is provided at a position in the flat surface portion 52*a*1 of the connecting member 52*a* opposing an end portion (upper end portion) of the groove portion 511*b*. The hole 522*a* communicates with the air connecting port 522 through a flow passage formed in the interior of the connecting member 52*a*. When the holder body 510 and the connecting member 52*a* are joined together, the hole 522*a* opposes an end portion of the groove portion 511*b*. As a result of this, the air connecting port 522 communicates with the upstream portion 57*a*1 of the air flow passage 57*b*.

A groove portion 513*b* is provided in the lower surface portion 51*b* of the holder body 510. When the holder body 510 and the bottom cover 53 are joined together, the groove portion 513*b* is covered by the upper surface portion 53*b* of the bottom cover 53. As a result of this, the downstream portion of the air flow passage 57*b* (second portion of the flow path) is formed.

The groove portion 513*b* of the present embodiment extends along the lower surface portion 51*b* toward the +X side and the +Y side (FIG. 7B). To be noted, the extension direction of the groove portion 513*b* may be changed within the in-plane direction of the lower surface portion 51*b*, and the groove portion 513*b* may be bent once or more times within the surface of the lower surface portion 51*b*.

In addition, an end portion of the groove portion 513*b* (end portion on the +X side) communicates with the air discharge port 514*b* through a hole provided in the holder body 510 (FIG. 7C.). Therefore, when the holder body 510 and the bottom cover 53 are joined together, the downstream portion of the air flow passage 57*b* communicates with the air discharge port 514*b*.

As described above, by providing the groove portions 511*b* and 513*b* respectively on two surfaces (flat surface portion 51*f* and lower surface portion 51*b*) of the holder body 510, the air flow passage 57*b* having a bent shape that cannot be realized within one plane can be formed.

Further, in the holder body 510 an inner flow passage 512*b* communicating with the groove portion 511*b* and the groove portion 513*b* are provided. The inner flow passage 512*b* is formed in a tunnel shape in the interior of the holder body 510. One end 512*b*1 (first connecting portion) of the inner flow passage 512*b* is open to the groove portion 511*b* at a position away in the Z-axis direction from the ridge portion R1. The other end 512*b*2 (second connecting portion) of the inner flow passage 512*b* is open to the groove portion 513*b* at a position away in the X-axis direction from the ridge portion R1.

In other words, the inner flow passage 512*b* is a path extending in the holder body 510 while bypassing the ridge portion R1, and is configured to interconnect the upstream portion and the downstream portion of the air flow passage 57*b*. To be noted, an end portion 511*bi* (FIG. 7C) of the groove portion 511*b* on the side closer to the ridge portion R1 is provided at a position away from the ridge portion R1 in the Z-axis direction. An end portion 513*b*1 (FIG. 7C) of the groove portion 513*b* on the side closer to the ridge portion R1 is provided at a position away from the ridge portion R1 in the X-axis direction. That is, the groove portions 511*b* and 513*b* are both formed to not reach the ridge portion R1.

In the present embodiment, the two air flow passages 57*a* and 57*b* are defined by the one holder body 510, the one connecting member 52*a*, and the one bottom cover 53. As a result of this, a plurality of flow passages for conveying toner by using air can be realized by a simple configuration.

In other words, the developing container 3Y (accommodating portion) is set as a first accommodating portion, the cartridge 430Y (replenishment container) is set as a first replenishment container, the air flow passage 57*a* (flow path) is set as a first flow path, and the inner flow passage 512*a* is set as a first inner flow passage. In this case, the image forming portion 1A includes another development container 3M (second accommodating portion) for accommodating toner. The cartridge holder 51 (flow passage forming portion) forms the air flow passage 57*b* (second flow path) in which the air for replenishing the developing container 3M (second accommodating portion) with toner from the cartridge 430M (second replenishment container) different from the cartridge 430Y One of the flat surface portion 51*f* (first surface) and the flat surface portion 52*a*1 (third surface) is provided with the groove portion 511*b* (another first groove portion) recessed in a direction away from the other in the first direction. The groove portion 511*b* is covered by the holder body 510 (first member) or the connecting member 52*a* (second member) including the other of the flat surface portion 51*f* (first surface) and the flat surface portion 52*a*1 (third surface), so that one part of the air flow passage 57*b* (second flow path) is formed. One of the lower surface portion 51*b* (second surface) and the upper surface portion 53*b* (fourth surface) is provided with the groove portion 513*b* (another second groove portion)

recessed in a direction away from the other in the second direction. The groove portion 513*b* is covered by the holder body 510 (first member) or the bottom cover 53 (third member) including the other of the lower surface portion 51*b* (second surface) and the upper surface portion 53*b* (fourth surface), so that the other part of the air flow passage 57*b* (second flow path) is formed. The holder body 510 (first member) includes the inner flow passage 512*b* that is formed in the interior of the holder body 510 and that is open to the one part and the other part of the air flow passage 57*b* (second flow path) respectively at positions away from the ridge portion R1. As a result of this, a plurality of flow paths can be realized with a simple configuration.

3. Air Supply Paths to Cartridges 430C and 430K

The air supply paths to the cartridges 430C and 430K are basically the same as the air supply paths to the cartridges 430Y and 430M except that the connecting member 52*d* is used instead of the connecting member 52*a*.

As illustrated in FIGS. 6A and 6B, the air connecting ports 523 and 524 are provided in the connecting member 52*d*. The holder body 510 includes a flat surface portion 51*h* opposing the connecting member 52*d*. The connecting member 52*d* includes a flat surface portion 52*d*1 opposing the holder body 510. In the present embodiment, the connecting member 52*d* is joined to the holder body 510 by bonding the flat surface portions 51*h* and 52*d*1 together by using an adhesive. The flat surface portion 51*h* of the holder body 510 and the flat surface portion 52*d*1 of the connecting member 52*d* are substantially parallel surfaces. The flat surface portions 51*h* and 52*d*1 of the present embodiment extend in a direction intersecting with the X-axis direction. The flat surface portion 51*h* of the holder body 510 is a surface facing toward one side (−X side) in the X-axis direction, and the flat surface portion 52*d*1 of the connecting member 52*d* is a surface facing toward the other side (+X side) in the X-axis direction.

The flat surface portion 51*h* of the holder body 510 has groove portions 511*c* and 511*d*. When the holder body 510 and the connecting member 52*d* are joined together, the groove portions 511*c* and 511*d* are covered by the flat surface portion 52*d*1 of the connecting member 52*d*. As a result of this, the upstream portions of air flow passages 57*c* and 57*d* (first portions of the flow paths) are formed.

The groove portions 511*c* and 511*d* of the present embodiment extend approximately along the Z-axis direction (FIG. 7A). To be noted, the extension direction of the groove portions 511*c* and 511*d* may be changed within the in-plane direction of the flat surface portion 51*h*, and the groove portions 511*c* and 511*d* may be bent once or more times within the surface of the flat surface portion 51*h*.

In addition, hole 523*a* and 524*a* (FIG. 6A) are provided at positions in the flat surface portion 52*d*1 of the connecting member 52*d* opposing end portions (upper end portions) of the groove portions 511*c* and 511*d*. The holes 523*a* and 524*a* communicate with the air connecting ports 523 and 524 through flow passages formed in the interior of the connecting member 52*d*. When the holder body 510 and the connecting member 52*d* are joined together, the holes 523*a* and 524*a* respectively oppose end portions of the groove portions 511*c* and 511*d*. As a result of this, the air connecting ports 523 and 524 communicate with the upstream portions of the air flow passages 57*c* and 57*d*.

The groove portions 513*c* and 513*d* are provided in the lower surface portion 51*b* of the holder body 510. When the holder body 510 and the bottom cover 53 are joined together, the groove portions 513*c* and 513*d* are covered by the upper surface portion 53*b* of the bottom cover 53. As a result of this, the downstream portions of the air flow passages 57*c* and 57*d* (second portions of the flow paths) are formed.

The groove portion 513*c* of the present embodiment extends along the lower surface portion 51*b* toward the +X side and the −Y side (FIG. 7B). The groove portion 513*d* of the present embodiment extends along the lower surface portion 51*b* toward the +X side and the −Y side (FIG. 7B). The extension directions of the groove portions 513*c* and 513*d* are different, and the extension direction of the groove portion 513*d* is closer to the Y-axis direction. To be noted, the extension directions of the groove portions 513*c* and 513*d* may be changed within the in-plane direction of the lower surface portion 51*b*, and the groove portions 513*c* and 513*d* may be bent once or more times within the surface of the lower surface portion 51*b*.

In addition, end portions of the groove portions 513*c* and 513*d* (end portions on the +X side) respectively communicate with the air discharge ports 514*c* and 514*d* through holes provided in the holder body 510 (FIG. 7C.). Therefore, when the holder body 510 and the bottom cover 53 are joined together, the downstream portions of the air flow passages 57*c* and 57*d* respectively communicate with the air discharge ports 514*c* and 514*d*.

As described above, by providing the groove portions 511*c*, 511*d*, 513*c*, and 513*d* respectively on two surfaces (flat surface portion 51*h* and lower surface portion 51*b*) of the holder body 510, the air flow passages 57*c* and 57*d* having bent shapes that cannot be realized within one plane can be formed.

Further, an inner flow passage 512*c* through which the groove portions 511*c* and 513*c* communicate with each other and an inner flow passage 512*d* through which the groove portions 511*d* and 513*d* communicate with each other are provided in the holder body 510. The inner flow passages 512*c* and 512*d* are each formed in a tunnel shape in the interior of the holder body 510. One ends 512*cl* and 512*d*1 of the inner flow passages 512*c* and 512*d* are respectively open to the groove portions 511*c* and 511*d* at positions away in the Z-axis direction from a ridge portion R2. The other ends 512*c*2 and 512*d*2 of the inner flow passages 512*c* and 512*d* are respectively open to the groove portions 513*c* and 513*d* at positions away in the X-axis direction from the ridge portion R2.

In other words, the inner flow passages 512*c* and 512*d* are each a path extending in the holder body 510 while bypassing the ridge portion R2, and are each configured to interconnect the upstream portion and the downstream portion of corresponding one of the air flow passages 57*c* and 57*d*. To be noted, end portions (FIG. 7C) of the groove portions 511*c* and 511*d* on the side closer to the ridge portion R2 are provided at positions away from the ridge portion R2 in the Z-axis direction. End portions (FIG. 7C) of the groove portions 513*c* and 513*d* on the side closer to the ridge portion R2 are provided at positions away from the ridge portion R2 in the X-axis direction. That is, the groove portions 511*c*, 511*d*, 513*c*, and 513*d* are formed to not reach the ridge portion R2.

The inner flow passages 512*c* and 512*d* are each formed in an approximate L shape including a portion extending approximately in the +X direction from an end portion of the corresponding one of the groove portions 511*c* and 511*d* on the side closer to the ridge portion R2 and a portion extending approximately in the +Z direction from an end portion of the corresponding one of the groove portions 513*c* and 513*d* on the side closer to the ridge portion R2.

Further, in the present embodiment, the two air flow passages 57*c* and 57*d* are defined by the one holder body 510, the one connecting member 52*d*, and the one bottom cover 53. As a result of this, a plurality of flow paths for conveying toner by using air can be realized with a simple configuration.

4. Summary of Air Supply Paths

The air flow passages 57*a*, 57*b*, 57*c*, and 57*d* described above can realize paths for supplying air to the cartridges 430 from the pump unit 80 in a small space. In addition, as illustrated in FIGS. 7A and 7B, it is easy to dispose the air discharge ports 514*a*, 514*b*, 514*c*, and 514*d* at positions shifted in arbitrary directions among the three-axis directions of X, Y, and Z from the corresponding ones of the air connecting ports 521, 522, 523, and 524. That is, the design flexibility of the flow passages can be improved by forming flow passages bent along a plurality of surfaces off the holder body 510.

An advantage of the present embodiment will be described below by taking the air flow passage 57*a* corresponding to the cartridge 430Y as an example.

In the present embodiment, by providing the groove portion 511*a* (first groove portion) and the groove portion 513*a* (second groove portion) respectively in two surfaces (flat surface portion 51*f* and lower surface portion 51*b*) of the holder body 510, the air flow passage 57*a* having a bent shape that cannot be realized within one plane can be formed.

Instead of employing the configuration in which the air flow passage 57*a* is provided in the cartridge holder 51, employing a configuration in which the air connecting port 521 is disposed in the vicinity of the air discharge port 514*a* and the air supply pipe 61 is extended to the vicinity of the air discharge port 514*a* and connected to the air connecting port 521 can be considered. However, if the air supply pipe 61 is extended to the vicinity of the air discharge port 514*a*, the space needed for providing the air supply pipe 61 can be large. Specifically, to suppress air leakage, the press-fit length of the air supply pipe 61 with respect to the air connecting port 521 (projection amount of the air connecting port 521) needs to be large to some degree. In addition, when warping the air supply pipe 61 in accordance with the positional relationship between the air connecting port 521 and the pump unit 80, the curvature radius thereof needs to be large such that the air supply pipe 61 does not buckle. Therefore, in the case where there is a restriction in the space near the air discharge port 514*a*, it can be difficult to extend the air supply pipe 61 to the vicinity of the air discharge port 514*a*.

Further, as another substitute configuration, connecting the air supply pipe 61 to an L-shaped pipe (bent pipe) instead of providing the air flow passage 57*a* in the cartridge holder 51 can be also considered. However, if the L-shaped pipe is configured to be press-fit in the air supply pipe 61 to secure the airtightness, the inner diameter of the L-shaped pipe is supposed to be small, which makes the flow passage narrow, and this leads to a disadvantage such as a large pressure drop of the air.

According to the present embodiment, even in the case where the space near the air discharge port 514*a* is small, the air connecting port 521 can be provided at a position away from the air discharge port 514*a*, and the air connecting port 521 and the air discharge port 514*a* can be interconnected by the air flow passage 57*a* in the cartridge holder 51. The air flow passage 57*a* is formed by covering and thus sealing the groove portions 511*a* and 513*a* provided in the holder body 510 by the connecting member 52*a* and the bottom cover 53, and thus can be realized in a small space. In addition, the air flow passage 57*a* can be bent in a steep angle that is difficult for a method of curving the air supply pipe 61.

More specifically, in the present embodiment, the cartridge 430Y (replenishment container) is configured to be attached to the holder body 510 (first member). The cartridge 430Y is attached to the upstream side of the holder body 510 in an attachment direction (approximate −X direction) with respect to the holder body 510. In contrast, the pump unit 80 (air supplying portion) is disposed on the downstream side of the holder body 510 in the attachment direction. Further, the air discharge port 514*a* (second opening portion) connected to the cartridge 430Y is positioned upstream of the air connecting port 521 (first opening portion) connected to the pump unit 80 in the attachment direction. As a result of this, in the attachment direction, the distance between the pump unit 80 and the air connecting port 521 can be reduced, and the distance between the air discharge port 514*a* and the cartridge 430Y can be reduced. Further, the air connecting port 521 (first opening portion) and the air discharge port 514*a* (second opening portion) disposed at separate positions in the attachment direction can be interconnected by the air flow passage 57*a* having high design flexibility.

In addition, in the present embodiment, the pump unit 80 is disposed above the developing container 3Y (accommodating portion). The position of the cartridge 430Y (replenishment container) in the up-down direction (Z-axis direction) overlaps with the position of the developing container 3Y in the up-down direction. The inlet port 430Yb1 (opening portion) of the cartridge 430Y is disposed below the pump unit 80. Further, the air discharge port 514*a* (second opening portion) connected to the cartridge 430Y is positioned below the air connecting port 521 (first opening portion) connected to the pump unit 80. As a result of this, in the up-down direction, the distance between the pump unit 80 and the air connecting port 521 can be reduced, and the distance between the air discharge port 514*a* and the cartridge 430Y can be reduced. Further, the air connecting port 521 (first opening portion) and the air discharge port 514*a* (second opening portion) disposed at separate positions in the up-down direction can be interconnected by the air flow passage 57*a* having high design flexibility.

In addition, in the present embodiment, a direction (approximate +Z direction) in which the air discharge port 514*a* (second opening portion) connected to the cartridge 430Y faces is different from a direction (approximate −X direction) in which the air connecting port 521 (first opening portion) connected to the air supply pipe 61Y (tubular member) faces. Therefore, it is difficult to realize a steeply bent path similarly to the air flow passage 57*a* of the present embodiment by warping the flexible air supply pipe 61Y In contrast, according to the present embodiment, the air connecting port 521 (first opening portion) and the air discharge port 514*a* (second opening portion) having different opening directions can be interconnected by the air flow passage 57*a* having high design flexibility.

In addition, in the present embodiment, the groove portions 511*a* and 513*a* provided on two surfaces (flat surface portion 51*f* and lower surface portion 51*b*) of the holder body 510 are interconnected by the inner flow passage 512*a* formed in the holder body 510. The inner flow passage 512*a* is open respectively to the upstream portion 57*a*1 and the downstream portion 57*a*2 of the air flow passage 57*a* at positions away from the ridge portion R1 between the two surfaces. As a result of this, the possibility of leakage of air from a gap generated in the ridge portion R1 can be lowered.

If the groove portions 511*a* and 513*a* are directly connected to each other at the ridge portion R1, the flat surface portion 51*f* and the lower surface portion 51*b* of the holder body 510, the flat surface portion 52*a*1 of the connecting member 52*a*, and the upper surface portion 53*b* of the bottom cover 53 concentrate on the ridge portion R1. At this time, there is a possibility that a gap is generated between the flat surface portion 52*a*1 of the connecting member 52*a* and the upper surface portion 53*b* of the bottom cover 53. That is, there is a possibility that, in the case where the lower surface portion 51*b* of the holder body 510 is brought into firm contact with the upper surface portion 53*b* of the bottom cover 53, a gap is generated between the flat surface portion 52*a*1 of the connecting member 52*a* and the upper surface portion 53*b* of the bottom cover 53 due to the dimensional error during manufacture of parts, positioning error during joining, or the like. In the case where there is a gap like this, there is a possibility that air leaks to the outside of the cartridge holder 51 from the air flow passage 57*a*. To suppress occurrence of the gap in the vicinity of the ridge portion R1, reducing the dimensional error of parts and improving the precision of positional adjustment can be considered. However, this can lead to increase in the production costs and increase in the required workload.

In contrast, in the present embodiment, the groove portions 511*a* and 513*a* do not reach the ridge portion R1, and the groove portions 511*a* and 513*a* are interconnected by the inner flow passage 512*a* in the holder body 510. Therefore, even if there is a gap between the flat surface portion 52*a*1 of the connecting member 52*a* and the upper surface portion 53*b* of the bottom cover 53 at a position adjacent to the ridge portion R1, air does not leak through this gap. If the gap between the flat surface portion 51*f* of the holder body 510 and the flat surface portion 52*a*1 of the connecting member 52*a* and the gap between the lower surface portion 51*b* of the holder body 510 and the upper surface portion 53*b* of the bottom cover 53 are sealed, leakage of air to the outside of the cartridge holder 51 can be suppressed.

To be noted, in the present embodiment, there may be a gap Gi (FIG. 7C) between the connecting member 52*a* (second member) and the bottom cover 53 (third member) at a position adjacent to the ridge portion R1. As a result of this, for example, a possibility that the upper surface portion 53*b* of the bottom cover 53 cannot abut the lower surface portion 51*b* of the holder body 510 due to abutment between the bottom cover 53 and the connecting member 52*a* can be lowered.

Air Supply from Air Discharge Port to Cartridge

Air supply from the air discharge ports 514*a*, 514*b*, 514*c*, and 514*d* to the respective cartridges 430 will be described. In the description below, arbitrary one of the air discharge ports 514*a*, 514*b*, 514*c*, and 514*d* will be described as an air discharge port 514. As illustrated in FIGS. 3B and 5A, each air discharge port 514 faces up (approximately in the +Z direction).

As illustrated in FIGS. 3A and 5A, the cartridges 430 respectively include inlet ports 430Yb1, 430Mb1, 430Cb1, and 430Kb1 connected to corresponding ones of the air discharge ports 514. In a state in which each cartridge 430 is attached to the cartridge holder 51, the inlet ports 430Yb1, 430Mb1, 430Cb1, and 430Kb1 are each connected to the corresponding one of the air discharge ports 514.

The air discharged upward from each air discharge port 514 is supplied to the inside of the cartridge 430 through corresponding one of the inlet ports 430Yb1, 430Mb1, 430Cb1, and 430Kb1. The air supplied to the inside of each cartridge 430 is discharged to the outside together with toner from the cartridge 430. To be noted, the inner structure of the cartridge 430 will be described later.

The toner discharged from the cartridges 430 together with air enters the toner flow passages respectively through the toner inlet ports 515*a*, 515*b*, 515*c*, and 515*d* (FIGS. 3A and 6A) of the cartridge holder 51. Then, the toner is discharged through the toner connecting ports 525, 526, 527, and 528 (FIGS. 4B and 6B) serving as exits of the toner flow passages.

One ends (upstream end portions 62Yu, 62Mu, 62Cu, and 62Ku) of replenishment pipes 62Y, 62M, 62C, and 62K (FIGS. 3B and 4B) are respectively connected to the toner connecting ports 525, 526, 527, and 528. The replenishment pipes 62Y, 62M, 62C, and 62K are each a flexible tubular member (tube). In the description below, arbitrary one of the replenishment pipes 62Y, 62M, 62C, and 62K will be described as a replenishment pipe 62.

The toner inlet ports 515*a*, 515*b*, 515*c*, and 515*d* (FIG. 6A) of the cartridge holder 51 are through holes provided in a front surface portion of the holder body 510. The front surface portion of the holder body 510 is a surface opposing the rear surface (surface on the −X side) of each cartridge 430. The toner inlet ports 515*a*, 515*b*, 515*c*, and 515*d* face in the X-axis direction in which the developing units 9Y, 9M, 9C, and 9K are arranged in parallel. The direction in which the toner inlet ports 515*a*, 515*b*, 515*c*, and 515*d* face intersects with the direction in which the air discharge ports 514*a*, 514*b*, 514*c*, and 514*d* are open.

As illustrated in FIG. 6B, the toner connecting ports 525, 526, 527, and 528 are respectively provided in the connecting members 52*a*, 52*b*, 52*c*, and 52*d* provided on the rear surface portion of the cartridge holder 51. The toner connecting port 525 communicates with the toner inlet port 515*a* through the flow passage in the connecting member 52*a* and the flow passage formed between the groove portion provided in the flat surface portion 51*f* of the holder body 510 and the flat surface portion 52*a*1 of the connecting member 52*a*. The toner connecting port 526 communicates with the toner inlet port 515*b* through the flow passage in the connecting member 52*b*. The toner connecting port 527 communicates with the toner inlet port 515*c* through the flow passage in the connecting member 52*c*. The toner connecting port 528 communicates with the toner inlet port 515*d* through the flow passage in the connecting member 52*d* and the flow passage formed between the groove portion provided in the flat surface portion 51*h* of the holder body 510 and the flat surface portion 52*d*1 of the connecting member 52*d*.

As illustrated in FIG. 7A, the toner connecting ports 526 and 527 positioned in the center portion in the Y-axis direction among the toner connecting ports 525, 526, 527, and 528 face outward in the Y-axis direction and upward in the Z-axis direction. Therefore, the replenishment pipes 62M and 62C connected to the toner connecting ports 526 and 527 can be easily extended toward the end portion position of the process unit PK in the Y-axis direction through a space above the toner connecting ports 525 and 528 (FIG. 4B). To be noted, the replenishment pipes 62Y, 62M, 62C, and 62K are extended in the X-axis direction through the end portion position of the process unit PK in the Y-axis direction such that the replenishment pipes 62Y, 62M, 62C, and 62K do not block the optical path LK (FIG. 1) of the laser light.

The other ends (downstream end portions) of the replenishment pipes 62Y 62M, 62C, and 62K are respectively connected to the developing units 9Y, 9M, 9C, and 9K. Toner discharged from the toner connecting ports 525, 526, 527, and 528 is conveyed to the developing units 9Y, 9M, 9C, and 9K on an airflow respectively through the replenishment pipes 62Y 62M, 62C, and 62K. Thus, each developing unit 9 is replenished with toner.

A toner inlet port connected to the corresponding one of replenishment pipes 62 is provided in an upper surface of the developing container 3 serving as a toner accommodating portion in each developing unit 9. The developing container 3 is replenished with air (mixed air) including toner through the toner inlet port.

The image forming unit 50 is preferably configured such that it is easy to access the process units P and the replenishment pipes 62 for maintenance and replacement of the process units P, the replenishment pipes 62, and the like for services in case of malfunction. Therefore, the image forming unit 50 of the present embodiment is configured to be capable of being pulled out from the rear side (BE) to the front side (FE) with respect to the apparatus body 72 (intermediate transfer belt unit 11).

Structure of Cartridges

The structure of each cartridge 430 (toner container, replenishment container) of the present embodiment will be described with reference to FIGS. 8A to 10B.

Figure 9A:
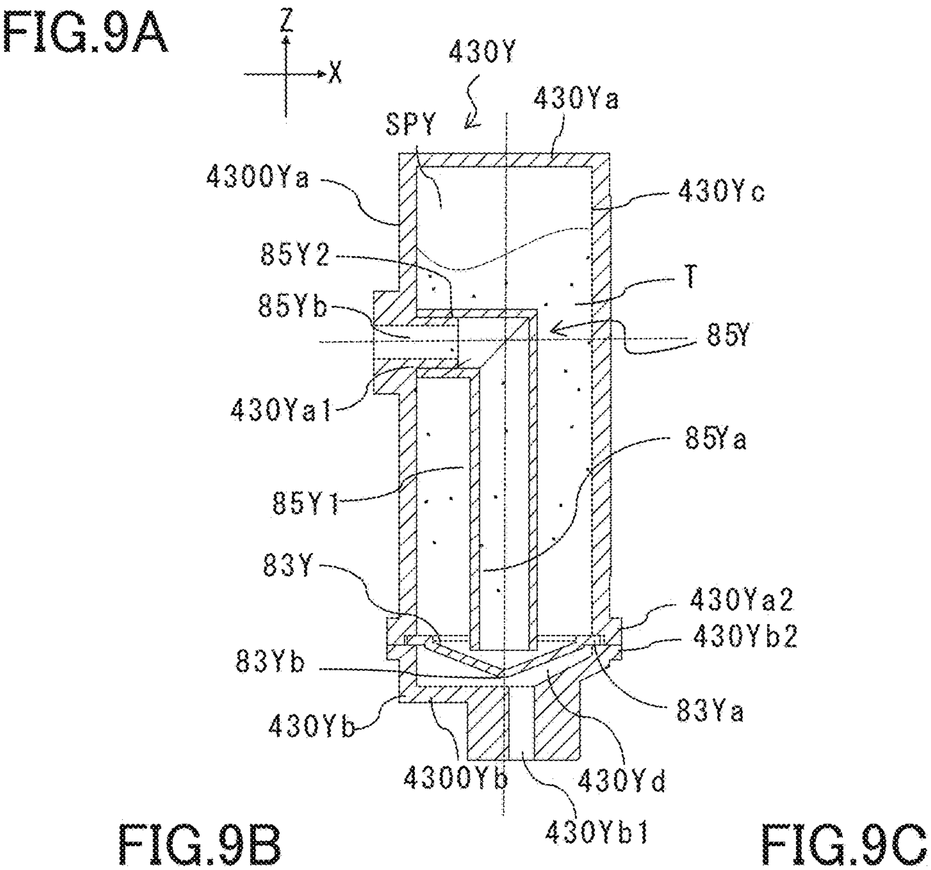
FIGS. 9A to 9C are each an explanatory diagram of the cartridge according to the first embodiment.
Figure 9B:
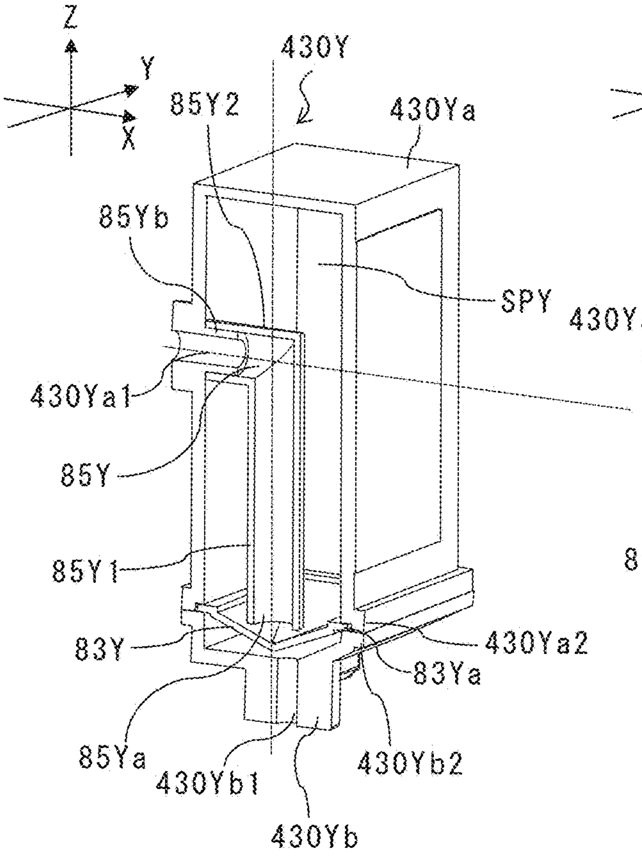
Figure 9C:
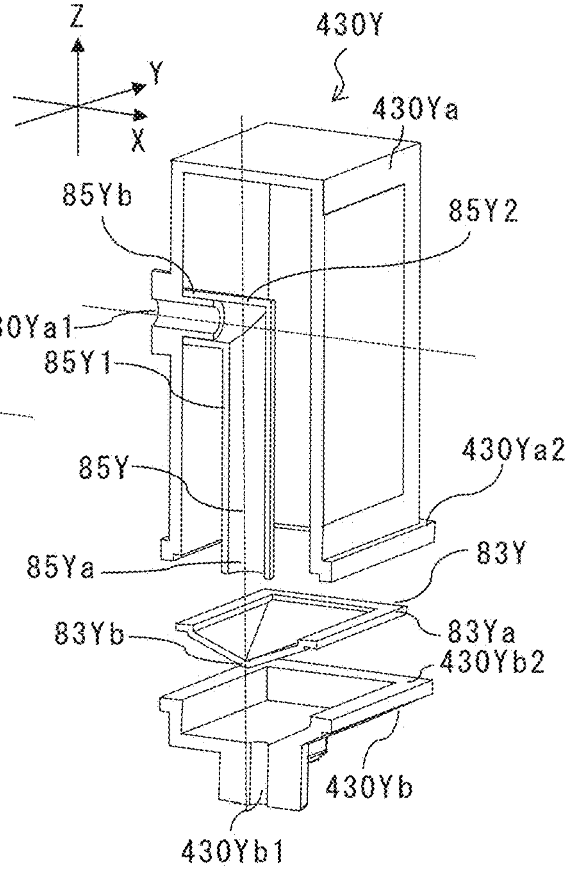
Figure 10A:
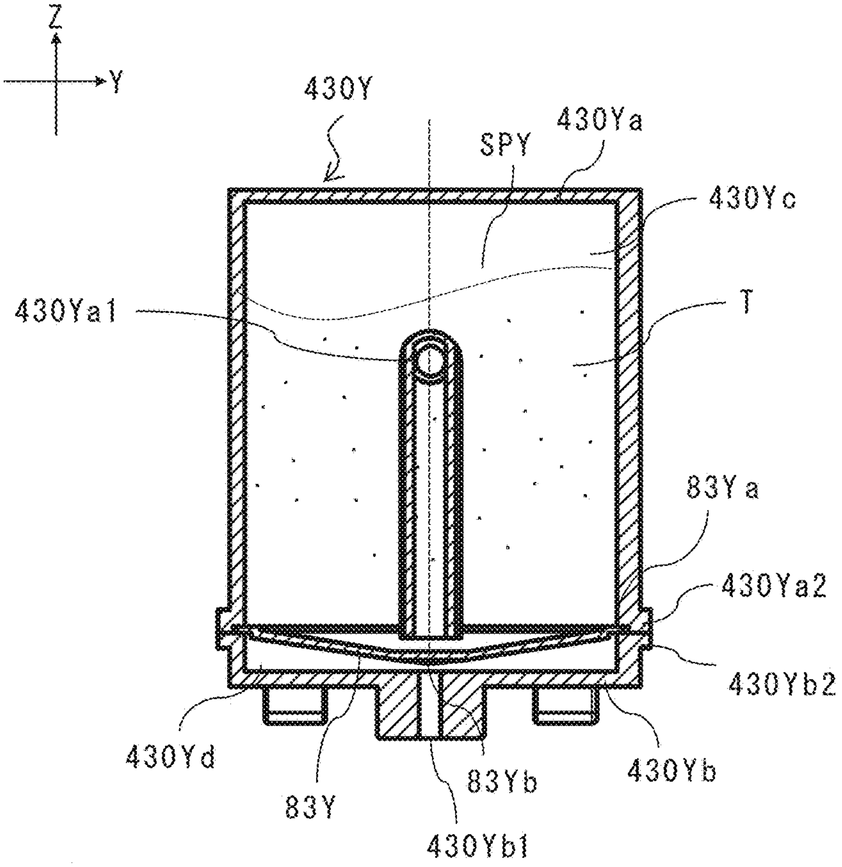
FIGS. 10A and 10B are each an explanatory diagram of the cartridge according to the first embodiment.
Figure 10B:
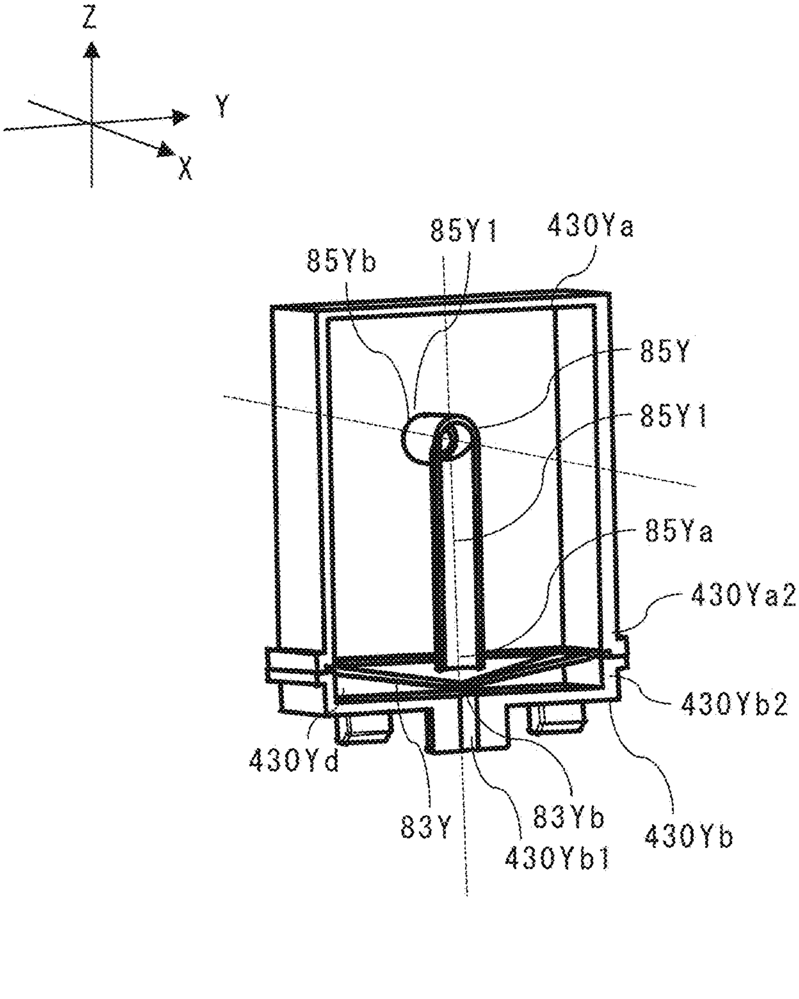

The cartridges 430Y, 430M, 430C, and 430K each basically have the same structure, and therefore the cartridge 430Y will be described below. FIGS. 8A, 8B, 8C, 8D, and 8E are respectively a front view, a top view, a bottom view, a right view, and a rear view of the cartridge 430Y FIG. 9A is a section view of the cartridge 430Y taken along a line H-H of FIG. 8E. FIG. 9B is a perspective section view of the cartridge 430Y FIG. 9C is an exploded perspective view of the cartridge 430Y of FIG. 9B. FIG. 10A is a section view of the cartridge 430Y taken along a line G-G of FIG. 8B. FIG. 10B is a perspective view of FIG. 10A. To be noted, the description of the structure of the cartridge 430Y described below is based on a state (posture) in which the cartridge 430Y is attached to the cartridge holder 51.

As illustrated in FIGS. 9A to 9C, the cartridge 430Y includes a first frame body 430Ya, a second frame body 430Yb, a filter 83Y (first filter, first ventilating member), and a discharge pipe 85Y (first discharge pipe, first channel). Although the illustration is omitted herein, the cartridge 430M similarly includes a first frame body, a second frame body, a filter (second filter, second ventilating member), and a discharge pipe (second discharge pipe, second channel). The cartridge 430C similarly includes a first frame body, a second frame body, a filter (third filter, third ventilating member), and a discharge pipe (third discharge pipe, third channel). The cartridge 430K similarly includes a first frame body, a second frame body, a filter (fourth filter, fourth ventilating member), and a discharge pipe (fourth discharge pipe, fourth channel).

The first frame body 430Ya and the second frame body 430Yb of the present embodiment are each a member formed from resin, but may be formed from paper or the like. As illustrated in FIG. 8E, a discharge port 430Ya1 (first discharge port) is provided in a rear surface 4300Ya of the first frame body 430Ya. As illustrated in FIG. 8C, the inlet port 430Yb1 (first inlet port, first introduction port) is provided in a bottom surface 4300Yb of the second frame body 430Yb. It is preferable that the discharge port 430Ya1 and the inlet port 430Yb1 are provided in surfaces of the cartridge 430Y excluding surfaces intersecting with the Y-axis direction (surfaces facing in the Y-axis direction) in which the cartridges 430Y, 430M, 430C, and 430K are arranged. As a result of this, the gaps G (Gym, Gmc, and Gck) between the cartridges 430Y, 430M, 430C, and 430K can be made narrower. As a result, the width of each cartridge 430 can be increased, and therefore the capacity for accommodating toner can be increased. To be noted, the gap Gym is a gap in the Y-axis direction between the cartridge 430Y and the cartridge 430M. The gap Gmc is a gap in the Y-axis direction between the cartridge 430M and the cartridge 430C. The gap Gck is a gap in the Y-axis direction between the cartridge 430C and the cartridge 430K.

In addition, the discharge port 430Ya1 is provided in the rear surface 4300Ya of the cartridge 430Y (end surface of the cartridge 430Y on the downstream side in the attachment direction) to face downstream in the attachment direction. The attachment direction in the present embodiment is a direction (−X direction) from the front side toward the rear side of the image forming apparatus 1. Therefore, it is easier to engage the discharge port 430Ya1 with the inlet port 429Ya of the cartridge holder 51 such that the discharge port 430Ya1 communicates with the inlet port 429*a* when attaching the cartridge 430Y to the cartridge holder 51. To be noted, the discharge port 430Ya1 may be provided in the bottom surface 4300Yb or the top surface of the cartridge 430Y, or the inlet port 430Yb1 may be provided in the rear surface 4300Ya or the top surface.

In the case where there is enough space in the apparatus body 72 or the like, the discharge port 430Ya1 and the inlet port 430Yb1 may be provided in surfaces intersecting with the Y-axis direction. In addition, the cartridge 430M includes a discharge port and the inlet port 430Mb1 (introduction port, FIG. 3A) of the same arrangement as in the cartridge 430Y The cartridge 430C includes a discharge port and the inlet port 430Cb1 (introduction port, FIG. 3A) of the same arrangement as in the cartridge 430Y The cartridge 430K includes a discharge port and the inlet port 430Kb1 (introduction port, FIG. 3A) of the same arrangement as in the cartridge 430Y.

The discharge port 430Ya1 may be provided with an unillustrated sealing member (sticker or a shutter). In a state in which the cartridge 430Y is not attached to the cartridge holder 51 of the apparatus body 72, the sealing member seals the discharge port 430Ya1 to suppress leakage of the toner T accommodated therein to the outside of the cartridge 430Y When attaching the cartridge 430Y to the cartridge holder 51, the sealing member is removed or moved such that the discharge port 430Ya1 is open.

Figure 8B:
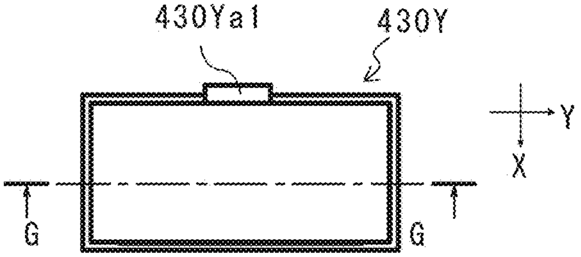
FIGS. 8A to 8E are each an explanatory diagram of a cartridge according to the first embodiment.
Figure 8A:
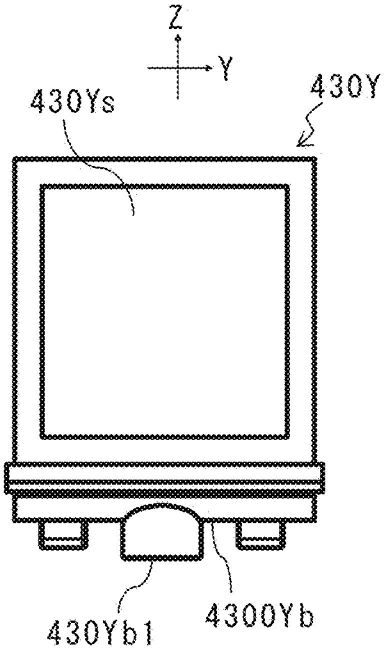
Figure 8D:
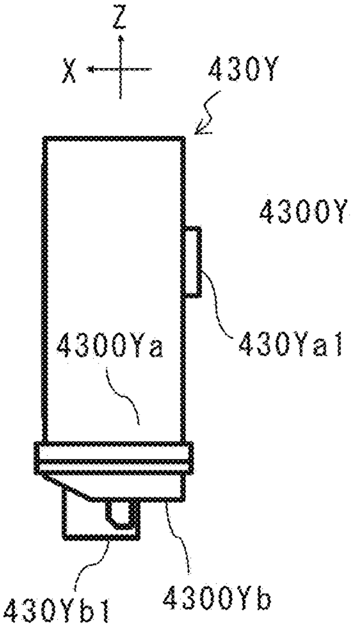
Figure 8E:
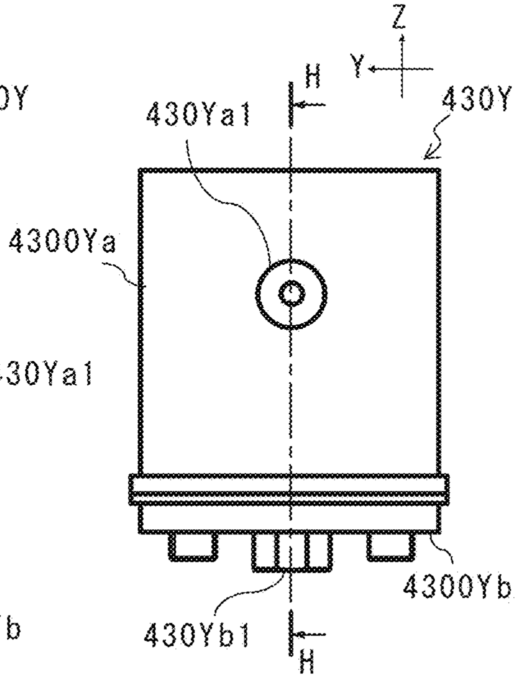
Figure 8C:
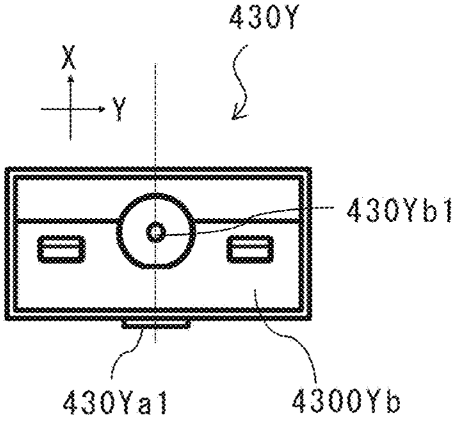

A label 430Ys on the front side of the cartridge 430Y illustrated in FIG. 8A is provided to display the color of toner therein. In addition, the label 430Ys may display an instruction illustrating how to attach the cartridge 430Y to the cartridge holder 51, or may display some kind of information about the cartridge 430Y.

The first frame body 430Ya and the second frame body 430Yb respectively include a flange portion 430Ya2 and a flange portion 430Yb2. An inner space SPY of the cartridge 430Y illustrated in FIG. 9A is defined by joining the flange portion 430Ya2 and the flange portion 430Yb2 to each other by ultrasonic welding or the like. To be noted, the flange portion 430Ya2 and the flange portion 430Yb2 may be joined together by an adhesive or a screw.

The filter 83Y is provided to segment (divide) the inner space SPY of the cartridge 430Y into two chambers of a toner chamber 430Yc (first chamber) and an air chamber 430Yd (second chamber). That is, the air chamber 430Yd is adjacent to the toner chamber 430Yc with the filter 83Y therebetween. Also in each of the other cartridges 430M, 430C, and 430K, the inner space of the cartridge is segmented (divided) into a toner chamber and an air chamber by the filter. These air chambers are each adjacent to the corresponding one of the toner chambers with the filter therebetween.

The toner chamber 430Yc is positioned above the air chamber 430Yd, and is aligned with the air chamber 430Yd in the Z-axis direction. That is, the attachment posture of the cartridge 430Y with respect to the apparatus body 72 is a posture in which the cartridge 430Y is oriented such that the toner chamber 430Yc is positioned above the air chamber 430Yd. The aligning direction of the toner chamber 430Yc and the air chamber 430Yd is the Z-axis direction. Therefore, in the present embodiment, the inlet port 430Yb1 faces in this aligning direction, and the discharge port 430Ya1 faces in a direction intersecting with this aligning direction.

The toner chamber 430Yc (accommodating space) is configured to accommodate the toner T. In the toner chamber 430Yc, the toner T is supported by the filter 83Y.

The air chamber 430Yd does not accommodate toner. The filter 83Y is constituted by, for example, a porous member formed from resin fiber, and the sizes and density of the pores therein are set to such values that flow passage of air is allowed but flow passage of toner is suppressed. That is, the filter 83Y is configured to allow flow passage of air and suppress flow passage of toner. As illustrated in FIGS. 9A to 10B, an outer edge portion 83Ya of the filter 83Y is nipped between the flange portion 430Ya2 of the first frame body 430Ya and the flange portion 430Yb2 of the second frame body Yb, and thus the filter 83Y is held by the first frame body 430Ya and the second frame body 430Yb. The filter 83Y is inclined from the outer edge portion 83Ya toward a lowermost portion 83Yb provided below the outer edge portion 83Ya. That is, the filter 83Y includes a portion (inclined portion) that is lower at a portion thereof closer to the lowermost portion 83Yb in the X-axis direction, the Y-axis direction, or the horizontal direction.

The lowermost portion 83Yb is a portion projecting with respect to the outer edge portion 83Ya in a direction from the toner chamber 430Yc toward the air chamber 430Yd. The lowermost portion 83Yb is provided at a center portion of the filter 83Y in the X-axis direction and the Y-axis direction as illustrated in FIGS. 9A and 10B. As the filter 83Y, one formed in a square pyramid shape having the lowermost portion 83Yb as an apex is used.

The toner chamber 430Yc is provided with a discharge pipe 85Y (channel). The discharge pipe 85Y of the present embodiment is a member formed from resin, but may be formed from paper, rubber, or the like. The discharge pipe 85Y is a pipe having an entrance 85Ya (first opening) and an exit 85Yb (second opening) and extending from the entrance 85Ya to the exit 85Yb. The discharge pipe 85Y is a flow passage that the toner T accommodated in the toner chamber 430Yc passes through when being moved toward the discharge port 430Ya1. The discharge pipe 85Y includes a first portion 85Y1 provided with the entrance 85Ya and extending in the Z-axis direction, and a second portion 85Y2 provided with the exit 85Yb and extending in the X-axis direction. The direction in which the first portion 85Y1 extends and the direction in which the second portion 85Y2 extends intersect with each other (at a right angle in the present embodiment).

The exit 85Yb of the discharge pipe 85Y is connected to and thus communicates with the discharge port 430Ya1. The entrance 85Ya of the discharge pipe 85Y is disposed to oppose the lowermost portion 83Yb that is part of the filter 83Y with a gap therebetween. The entrance 85Ya is preferably close to the filter 83Y In the case where the remaining amount of toner T in the toner chamber 430Yc is small, the toner T fluidized by the air received through the inlet port 430Yb1 moves in accordance with the inclination of the filter 83Y described above, and gathers at the lowermost portion 83Yb. The toner T having gathered at the lowermost portion 83Yb of the filter 83Y enters the entrance 85Ya of the discharge pipe 85Y, and is guided to the discharge port 430Ya1 through the discharge pipe 85Y As a result of this, the toner T can be efficiently discharged to the outside of the cartridge 430Y even in the case where the remaining amount of the toner accommodated in the toner chamber 430Yc of the cartridge 430Y is small.

The cartridge 430Y of the present embodiment has a structure that discharges toner to the outside of the cartridge by air, and is not provided with a rotary member such as a screw. Therefore, the cartridge can be configured in a simple structure with a small number of parts.

Toner Conveyance Mechanism

The mechanism of conveying the toner accommodated in the toner chamber 430Yc of the cartridge 430Y to the developing unit 9Y will be described.

The air discharged from the pump of the pump unit 80 corresponding to the cartridge 430Y is discharged from the air discharge port 514*a* (FIG. 5B) opposing the cartridge 430Y through the air supply pipe 61Y and the air flow passage 57*a* of the cartridge holder 51. The air discharged from the air discharge port 514*a* is received by the air chamber 430Yd through the inlet port 430Yb1 of the cartridge 430Y In this case, the atmospheric pressure in the air chamber 430Yd (FIG. 9D) increases, and the air flows into the toner chamber 430Yc from the air chamber 430Yd through the filter 83Y The air having flowed into the toner chamber 430Yc enters gaps between particles of the toner T, and thus fluidizes the toner T. The toner T mixed with the air and thus fluidized is moved in the discharge pipe 85Y from the entrance 85Ya to the exit 85Yb by the air received by the air chamber 430Yd though the inlet port 430Yb1, and is discharged to the outside of the cartridge 430Y from the discharge port 430Ya1.

By providing the air chamber 430Yd having high airtightness between the ejection port of the pump unit 80 and the filter 83Y, the air ejected from the ejection port efficiently flows to the filter 83Y without being scattered to the outside of the cartridge 430Y For example, in a situation in which the toner T in the toner chamber 430Yc is likely to aggregate such as a situation in which a vibration is received or the cartridge 430Y has been left to stand for a long period of time, the pressure required for causing the air to flow into the cartridge 430Y through the filter 83Y can be high. Also in this case, by increasing the pressure (atmospheric pressure) in the air chamber 430Yd by continuing sending air from the pump unit 80 to the air chamber 430Yd, the air can be sent into the toner chamber 430Yc through the filter 83Y In addition, by providing the air chamber 430Yd, the toner can be discharged from the cartridge 430Y even in the case where the air supply amount of the pump unit 80 is relatively small. That is, it suffices as long as the pump unit 80 has performance to generate a pressure high enough to continue sending air into the air chamber 430Yd to reach a pressure enough to cause the air to pass through the filter 83Y into the toner chamber 430Yc, and there is no particular requirement in the ejection speed and ejection amount thereof. Therefore, a small pump unit 80 can be employed, which contributes to miniaturization of the apparatus.

The toner T discharged from the discharge port 430Ya1 of the cartridge 430Y enters the replenishment pipe 62Y from an upstream end portion 62Yu of the replenishment pipe 62Y through the toner inlet port 515*a* of the cartridge holder 51 as illustrated in FIG. 4B. The toner T having entered the replenishment pipe 62Y from the upstream end portion 62Yu is moved to a downstream end portion of the replenishment pipe 62Y by the air flowing into the replenishment pipe 62Y together with the toner T.

To improve the air discharging performance of the developing unit 9Y, an exhausting filter portion PYf is provided on the upper surface of the developing unit 9Y as illustrated in FIG. 3. The exhausting filter portion PYf is a portion where a through hole is provided in the frame body constituting the developing unit 9Y and a filter formed from an unwoven fabric or the like is stuck to cover the through hole. The toner T having flowed into the developing unit 9Y from the replenishment pipe 62Y remains inside the developing unit 9Y, and at least part of the air is discharged to the outside of the developing unit 9Y through the exhausting filter portion PYf. As a result of this, increase in the internal pressure in the developing unit 9Y is suppressed, and the toner T and the air is more likely to flow into the developing unit 9Y from the cartridge 430Y through the replenishment pipe 62Y The other developing units 9M, 9C, and 9K are similarly provided with exhausting filter portions PMf, PCf, and PKf, respectively.

In the present embodiment, the exhausting filter portion PYf is provided at a portion of the upper surface of the developing unit 9Y on the downstream side in the flow-in direction (+Y direction) of the toner in the Y-axis direction. The exhausting filter portion PYf may be provided on a side surface of the developing unit 9Y instead of the upper surface thereof.

The toner supplied to the inside of the developing unit 9Y (developing container 3Y) is agitated and flattened by agitating members SY1 and SY2 illustrated in FIG. 5B. In the case where the downstream end portion of the replenishment pipe 62Y is connected to one end portion of the developing unit 9Y in the Y-axis direction, the agitating members SY1 and SY2 each may be a screw that conveys the toner in a direction (+Y direction) from the one end portion of the developing unit 9Y toward the other end portion in the Y-axis direction. In addition, the number of agitating members may be one, three, or more in accordance with the required agitation efficiency of toner T in the developing unit 9Y The other developing units 9M, 9C, and 9K are similarly provided with agitating members SM1, SM2, SC1, SC2, SK1, and SK2, respectively.

In the case of a configuration in which the direction of the conveyance path changes in the middle thereof or a configuration in which the conveyance path is different for each color as in the replenishment pipe 62 of the present embodiment, air is preferably employed as a conveyance medium for conveying the toner. In this case, the design flexibility of the conveyance path is improved as compared with the case of employing a screw or the like as the conveyance medium, and since the conveyance member is not required, the number of parts can be reduced.

In each process unit P, the developing unit 9 may be configured to be movable in the apparatus body. For example, the developing unit 9 may be configured to be swingable with respect to the drum unit 8, or pressed toward the drum unit 8. In this case, each replenishment pipe 62 is preferably formed from a stretchable flexible material (bendable material). As a result of this, a situation in which each replenishment pipe 62 hinders the operation of the developing unit 9 can be suppressed, and addition of parts for the operation of the corresponding developing unit 9 can be suppressed.

Second Embodiment

The cartridge holder 51 (flow passage forming portion) according to a second embodiment will be described with reference to FIG. 11. In the description below, it is assumed that elements denoted by the same reference signs as in the first embodiment have basically the same configurations and functions as those described in the first embodiment unless otherwise described, and parts different from the first embodiment will be mainly described.

Figure 11:
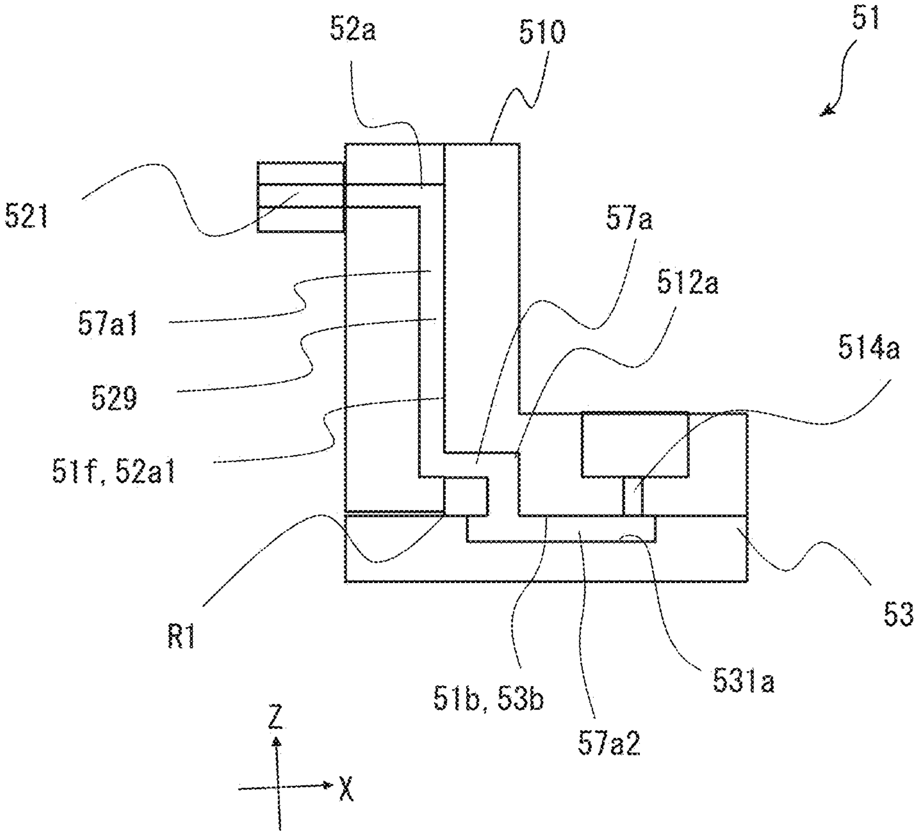
FIG. 11 is a section view of a cartridge holder according to a second embodiment.

FIG. 11 is a section view of the cartridge holder 51 according to the second embodiment, and corresponds to FIG. 7C of the first embodiment. The second embodiment is different from the first embodiment in that a groove portion 529 serving as a first groove portion is provided in the flat surface portion 52*a*1 of the connecting member 52*a* (third surface of the second member). In addition, the second embodiment is different from the first embodiment in that a groove portion 531*a* serving as a second groove portion is provided in the upper surface portion 53*b* of the bottom cover 53 (fourth surface of the third member). The other elements of the configuration of the cartridge holder 51 are basically the same as in the first embodiment.

When the holder body 510 and the connecting member 52*a* are joined, the groove portion 529 is covered by the flat surface portion 51*f* (first surface) of the holder body 510. As a result of this, the upstream portion 57*a*1 of the air flow passage 57*a* (first portion of the flow passage) is formed. When the holder body 510 and the bottom cover 53 are joined, the groove portion 531*a* is covered by the lower surface portion 51*b* of the holder body 510. As a result of this, the downstream portion 57*a*2 of the air flow passage 57*a* (second portion of the flow passage) is formed.

As described above, by providing the groove portions 529 and 531*a* in surfaces (flat surface portion 52*a*1 and upper surface portion 53*b*) of other members opposing two surfaces of the holder body 510, the air flow passage 57*a* having a bent shape that cannot be realized in one plane can be formed. That is, according to the second embodiment, the design flexibility of the flow passage can be improved similarly to the first embodiment.

Further, the holder body 510 is provided with the inner flow passage 512*a* through which the groove portion 529 and the groove portion 531*a* communicate with each other. The inner flow passage 512*a* is formed in the interior of the holder body 510. One end of the inner flow passage 512*a* is open to a region of the flat surface portion 51*f* opposing the groove portion 529 at a position away in the Z-axis direction from the ridge portion R1. The other end of the inner flow passage 512*a* is open to a region of the lower surface portion 51*b* opposing the groove portion 531*a* at a position away in the X-axis direction from the ridge portion R1

In other words, the upstream portion 57*a*1 (first portion of the flow passage) and the downstream portion 57*a*2 (second portion of the flow passage) of the air flow passage 57*a* are interconnected by the inner flow passage 512*a* formed in the interior of the holder body 510. The inner flow passage 512*a* are open to the upstream portion 57*a*1 and the downstream portion 57*a*2 of the air flow passage 57*a* at positions away from the ridge portion R1 between the two surfaces. As a result of this, similarly to the first embodiment, the possibility of leakage of air from a gap generated at the ridge portion R1 can be lowered.

Third Embodiment

The cartridge holder 51 (flow passage forming portion) according to a third embodiment will be described with reference to FIG. 12. In the description below, it is assumed that elements denoted by the same reference signs as in the first embodiment have basically the same configurations and functions as those described in the first embodiment unless otherwise described, and parts different from the first embodiment will be mainly described.

Figure 12:
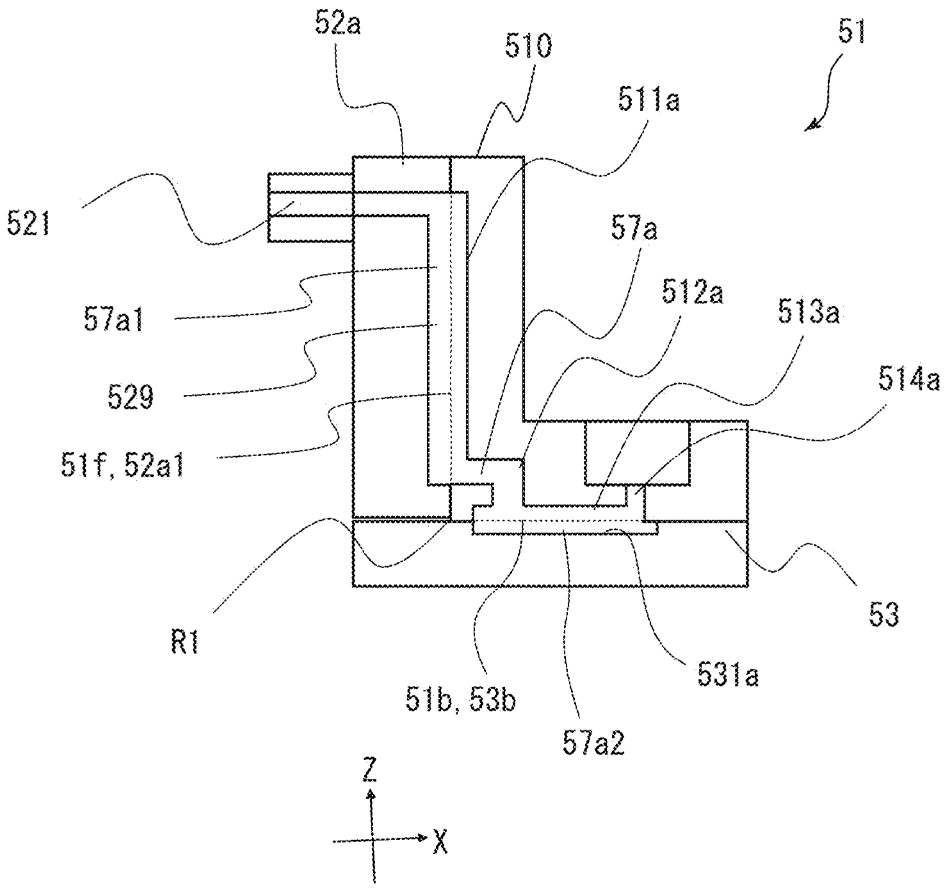
FIG. 12 is a section view of a cartridge holder according to a third embodiment.

FIG. 12 is a section view of the cartridge holder 51 according to the third embodiment, and corresponds to FIG. 7C of the first embodiment. The third embodiment is different from the first embodiment in that the groove portion 529 serving as a third groove portion constituting part of the air flow passage 57*a* together with the groove portion 511*a* is provided in the flat surface portion 52*a*1 of the connecting member 52*a* (third surface of the second member) in addition to the groove portion 511*a* serving as a first groove portion. In addition, the third embodiment is different from the first embodiment in that the groove portion 531*a* serving as a fourth groove portion constituting part of the air flow passage 57*a* together with the groove portion 513*a* is provided in the upper surface portion 53*b* of the bottom cover 53 (fourth surface of the third member) in addition to the groove portion 513*a* serving as a second groove portion.

When the holder body 510 and the connecting member 52*a* are joined together, the groove portion 511*a* opposes the groove portion 529. As a result of this, the upstream portion 57*a*1 of the air flow passage 57*a* (first portion of the flow passage) is formed. When the holder body 510 and the bottom cover 53 are joined together, the groove portion 513*a* opposes the groove portion 531*a*. As a result of this, the downstream portion 57*a*2 of the air flow passage 57*a* (second portion of the flow passage) is formed.

As described above, by providing the groove portions 511*a*, 513*a*, 529, and 531*a* in two surfaces of the holder body 510 and surfaces of other members opposing the two surfaces, the air flow passage 57*a* having a bent shape that cannot be realized in one plane can be formed. That is, according to the third embodiment, the design flexibility of the flow passage can be improved similarly to the first embodiment.

Further, the holder body 510 is provided with the inner flow passage 512*a* through which the groove portion 511*a* and the groove portion 513*a* communicate with each other. The inner flow passage 512*a* is formed in the interior of the holder body 510. One end of the inner flow passage 512*a* is open to the groove portion 511*a* at a position away in the Z-axis direction from the ridge portion R1. The other end of the inner flow passage 512*a* is open to the groove portion 513*a* at a position away in the X-axis direction from the ridge portion R1.

In other words, the upstream portion 57*a*1 (first portion of the flow passage) and the downstream portion 57*a*2 (second portion of the flow passage) of the air flow passage 57*a* are interconnected by the inner flow passage 512*a* formed in the interior of the holder body 510. The inner flow passage 512*a* are open to the upstream portion 57*a*1 and the downstream portion 57*a*2 of the air flow passage 57*a* respectively at positions away from the ridge portion R1 between the two surfaces. As a result of this, similarly to the first embodiment, the possibility of leakage of air from a gap generated at the ridge portion R1 can be lowered.

In the present embodiment, since the upstream portion 57*a*1 of the air flow passage 57*a* is defined by the two groove portions 511*a* and 529 opposing each other, the sectional area of the flow passage can be made larger than in the first and second embodiments, and thus the pressure loss can be reduced. In addition, in the present embodiment, since the downstream portion 57*a*2 of the air flow passage 57*a* is defined by the two groove portions 513*a* and 531*a* opposing each other, the sectional area of the flow passage can be made larger than in the first and second embodiments, and thus the pressure loss can be reduced. Therefore, toner replenishment using air is also possible in the case of using a smaller air pump, and thus the apparatus can be miniaturized.

OTHER EMBODIMENTS

In the embodiments described above, an example in which the gap between the flat surface portion 51*f* and the flat surface portions 52*a*1 and 52*d*1 is sealed by gluing the cartridge holder 51 to the connecting members 52*a* and 52*d* has been described. In addition, in the embodiments, an example in which the gap between the lower surface portion 51*b* and the upper surface portion 53*b* is sealed by gluing the cartridge holder 51 to the bottom cover 53 has been described. The configuration is not limited to this, and the gap may be sealed by causing the cartridge holder 51 to abut the connecting members 52*a* and 52*d* with a sealing member (first sealing member) between the flat surface portion 51*f* and the flat surface portions 52*a*1 and 52*d*1. In addition, the gap may be sealed by causing the cartridge holder 51 to abut the bottom cover 53 with a sealing member (second sealing member) between the lower surface portion 51*b* and the upper surface portion 53*b*. In this case, the joining method is not limited to gluing as long as the members can be joined together in a state in which the sealing member is compressed. For example, the joining may be performed by screwing or snap-fitting.

The sealing member is a member formed from an elastic material such as rubber and having a holed sheet shape or a ring shape. As a specific example, one sealing member is disposed to surround the entire periphery of each of the groove portions 511*a* and 511*b* as viewed in the X-axis direction. Another sealing member is disposed to surround the entire periphery of each of the groove portions 511*c* and 511*d* as viewed in the X-axis direction. Another sealing member is disposed to surround the entire periphery of each of the groove portions 513*a*, 513*b*, 513*c*, and 513*d* as viewed in the Z-axis direction In addition, in the embodiments described above, a configuration example of a flow passage in which air flows mainly from the pump unit 80 to the cartridge 430 has been described. The configuration is not limited to this, and the configuration of the flow passage described in each embodiment may be applied to a flow passage in which air including toner flows from the cartridge 430 toward the developing container 3.

According to the present disclosure, the design flexibility of a flow passage can be improved, and an image forming apparatus capable of suppressing deterioration of the airtightness of the flow passage can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-200227, filed on Nov. 27, 2023, which is hereby incorporated by reference herein in its entirety.

What is claimed is:

1. An image forming apparatus comprising:

an air supplying portion configured to supply air for conveying toner, the air supplying portion being an air pump or a fan; and a resin assembly in which a first flow passage, a second flow passage, and a third flow passage are formed such that the air supplied by the air supplying portion flows through the first flow passage, the second flow passage, and the third flow passage in this order, wherein the resin assembly includes a first resin member having a first surface and a second surface, a second resin member having a third surface, and a third resin member having a fourth surface, the first surface and the second surface intersecting with each other with a ridge portion between the first surface and the second surface, wherein the first flow passage is formed in a gap between the first surface of the first resin member and the third surface of the second resin member, wherein the third flow passage is formed in a gap between the second surface of the first resin member and the fourth surface of the third resin member, wherein at least part of the second flow passage is a tunnel passing through an interior of the first resin member while bypassing the ridge portion, and wherein a first connecting portion where the first flow passage and the second flow passage are connected to each other and a second connecting portion where the second flow passage and the third flow passage are connected to each other are provided at positions away from the ridge portion of the first resin member.

2. The image forming apparatus according to claim 1, wherein the first resin member includes a first groove portion provided in the first surface of the first resin member, and wherein the first groove portion is covered by the third surface of the second resin member so that the first flow passage is formed.

3. The image forming apparatus according to claim 1, wherein the first resin member includes a second groove portion provided in the second surface of the first resin member, and wherein the second groove portion is covered by the fourth surface of the third resin member so that the third flow passage is formed.

4. The image forming apparatus according to claim 1, wherein the second resin member includes a first groove portion provided in the third surface of the second resin member, and wherein the first groove portion is covered by the first surface of the first resin member so that the first flow passage is formed.

5. The image forming apparatus according to claim 1, wherein the third resin member includes a second groove portion provided in the fourth surface of the third resin member, and wherein the second groove portion is covered by the second surface of the first resin member so that the third flow passage is formed.

6. The image forming apparatus according to claim 1, wherein the first resin member includes a first groove portion provided in the first surface of the first resin member, wherein the second resin member includes a third groove portion provided in the third surface of the second resin member, and wherein the first groove portion and the third groove portion oppose each other so that the first flow passage is formed.

7. The image forming apparatus according to claim 1, wherein the first resin member includes a second groove portion provided in the second surface of the first resin member, wherein the third resin member includes a fourth groove portion provided in the fourth surface of the third resin member, and wherein the second groove portion and the fourth groove portion oppose each other so that the third flow passage is formed.

8. The image forming apparatus according to claim 1, wherein the first flow passage is spaced apart from the ridge portion, wherein a first abutting region in which the first surface of the first resin member and the third surface of the second resin member abut each other is located between the first flow passage and the ridge portion of the first resin member, wherein the third flow passage is spaced apart from the ridge portion, and wherein a second abutting region in which the second surface of the first resin member and the fourth surface of the third resin member abut each other is located between the third flow passage and the ridge portion of the first resin member.

9. The image forming apparatus according to claim 1, wherein a gap is provided between the second resin member and the third resin member at a position adjacent to the ridge portion.

10. The image forming apparatus according to claim 1, wherein at least part of the first flow passage extends in a direction intersecting with the second surface of the first resin member, and wherein at least part of the second flow passage extends in a direction intersecting with the first surface of the first resin member.

11. The image forming apparatus according to claim 1, further comprising:

a replenishment container provided with an accommodating space to accommodate the toner; and an apparatus body to which the replenishment container is attachable, from which the replenishment container is detachable, and which includes an accommodating portion configured to accommodate the toner supplied from the replenishment container, wherein the resin assembly is disposed in the apparatus body, and wherein the first flow passage, the second flow passage, and the third flow passage constitute a flow path through which air supplied from the air supplying portion flows toward the replenishment container.

12. The image forming apparatus according to claim 11, wherein the resin assembly includes a first opening portion for receiving the air supplied from the air supplying portion, and a second opening portion configured to be connected to an opening portion provided in the replenishment container to take in the air from the air supplying portion.

13. The image forming apparatus according to claim 12, wherein the replenishment container is attached to the first resin member in an attachment direction, wherein the air supplying portion is positioned downstream of the first resin member in the attachment direction, and wherein the second opening portion is positioned upstream of the first opening portion in the attachment direction.

14. The image forming apparatus according to claim 12, wherein the air supplying portion is disposed above the accommodating portion, wherein a position of the replenishment container in an up-down direction overlaps with a position of the accommodating portion in the up-down direction, wherein the opening portion of the replenishment container is disposed below the air supplying portion, and wherein the second opening portion is positioned below the first opening portion.

15. The image forming apparatus according to claim 12, further comprising:

a flexible tube having one end connected to the air supplying portion and another end connected to the first opening portion, wherein a direction in which the first opening portion opens and a direction in which the second opening portion opens are different.

16. The image forming apparatus according to claim 1, wherein the resin assembly is formed such that air supplied from the air supplying portion flows through a fourth flow passage, a fifth flow passage, and a sixth flow passage in this order, and such that the fourth flow passage, the fifth flow passage, and the sixth flow passage are flow passages independent of the first flow passage, the second flow passage, and the third flow passage, wherein the fourth flow passage is formed in a gap between the first surface of the first resin member and the third surface of the second resin member, wherein the sixth flow passage is formed in a gap between the second surface of the first resin member and the fourth surface of the third resin member, wherein at least part of the fifth flow passage is a tunnel passing through an interior of the first resin member while bypassing the ridge portion, and wherein a connecting portion where the fourth flow passage and the fifth flow passage are connected to each other and a connecting portion where the fifth flow passage and the sixth flow passage are connected to each other are provided at positions away from the ridge portion of the first resin member.

17. The image forming apparatus according to claim 1, wherein the first surface of the first resin member and the third surface of the second resin member are glued together, and wherein the second surface of the first resin member and the fourth surface of the third resin member are glued together.

18. The image forming apparatus according to claim 1, further comprising:

a first elastic seal nipped between the first surface of the first resin member and the third surface of the second resin member; and a second elastic seal nipped between the second surface of the first resin member and the fourth surface of the third resin member.

19. The image forming apparatus according to claim 1, wherein the air supplying portion is the air pump.

* * * * *